United States Patent
Benson et al.

(10) Patent No.: US 10,042,081 B2
(45) Date of Patent: Aug. 7, 2018

(54) SYSTEM AND METHOD FOR DYNAMIC FORMATION DETECTION USING DYNAMIC DEPTH WARPING

(71) Applicant: Motive Drilling Technologies Inc., Dallas, TX (US)

(72) Inventors: Todd W. Benson, Dallas, TX (US); Brian E. Stokeld, Lewisville, TX (US)

(73) Assignee: Motive Drilling Technologies Inc., Dallas, TX (US)

( * ) Notice: Subject to any disclaimer, the term of this patent is extended or adjusted under 35 U.S.C. 154(b) by 0 days.

(21) Appl. No.: 15/216,946

(22) Filed: Jul. 22, 2016

(65) Prior Publication Data

US 2016/0327678 A1 Nov. 10, 2016

Related U.S. Application Data

(63) Continuation-in-part of application No. 15/000,104, filed on Jan. 19, 2016, now Pat. No. 9,429,676, which is a continuation of application No. 14/627,794, filed on Feb. 20, 2015, now Pat. No. 9,238,960, which is a continuation of application No. 14/332,531, filed on
(Continued)

(51) Int. Cl.
| | |
|---|---|
| *G01V 1/40* | (2006.01) |
| *G01V 5/04* | (2006.01) |
| *E21B 47/022* | (2012.01) |
| *E21B 47/04* | (2012.01) |
| *E21B 47/12* | (2012.01) |
| *E21B 7/04* | (2006.01) |
| *G01V 1/28* | (2006.01) |

(Continued)

(52) U.S. Cl.
CPC ............... *G01V 5/04* (2013.01); *E21B 7/04* (2013.01); *E21B 47/022* (2013.01); *E21B 47/04* (2013.01); *E21B 47/044* (2013.01); *E21B 47/12* (2013.01); *G01V 5/045* (2013.01); *G01V 1/282* (2013.01); *G01V 1/40* (2013.01); *G01V 99/005* (2013.01); *G06F 17/40* (2013.01)

(58) Field of Classification Search
CPC .......... G01V 1/28; G01V 1/301; G01V 1/282; G01V 2210/60; G01V 2210/61; G01V 1/612–1/6124
USPC .......................................................... 702/6, 8
See application file for complete search history.

(56) References Cited

U.S. PATENT DOCUMENTS

| | | | | |
|---|---|---|---|---|
| 6,950,747 B2 * | 9/2005 | Byerly | ............... | G01V 3/082 181/122 |
| 7,408,150 B1 * | 8/2008 | Flaum | ............... | G01V 5/125 250/269.6 |

OTHER PUBLICATIONS

D.J. Lineman, J.D. Mendelson and M.N. Toksoz; "Well-to-Well Log Correlation Using Knowledge-Based Systems and Dynamic Depth Warping;" 1987; Massachusetts Institute of Technology, Earth Resources Laboratory; pp. 421-454.*

(Continued)

*Primary Examiner* — Mischita Henson
*Assistant Examiner* — Christine Liao
(74) *Attorney, Agent, or Firm* — Vinson & Elkins LLP

(57) ABSTRACT

In one example, a system and method for correlating first well log data with a previously generated well with second well log data from an actively drilling well. A identifying a starting depth is identified above a geological formation. The first well log data is dynamically gain adjusted to the second well log data. The gain adjusted first well log data is
(Continued)

dynamically depth warped to the second well log data to correlate the first well log data with the second well log data.

22 Claims, 21 Drawing Sheets

Related U.S. Application Data

Jul. 16, 2014, now Pat. No. 8,977,501, which is a continuation of application No. 14/186,470, filed on Feb. 21, 2014, now Pat. No. 8,818,729.

(60) Provisional application No. 61/838,689, filed on Jun. 24, 2013.

(51) Int. Cl.
*G01V 99/00* (2009.01)
*G06F 17/40* (2006.01)

(56) References Cited

OTHER PUBLICATIONS

Roberto H. Herrera and Mirko van der Baan; "Automated seismic-to-well ties using dynamic time warping;" 2012; Geoconvention: Vision; pp. 1-4.*

* cited by examiner

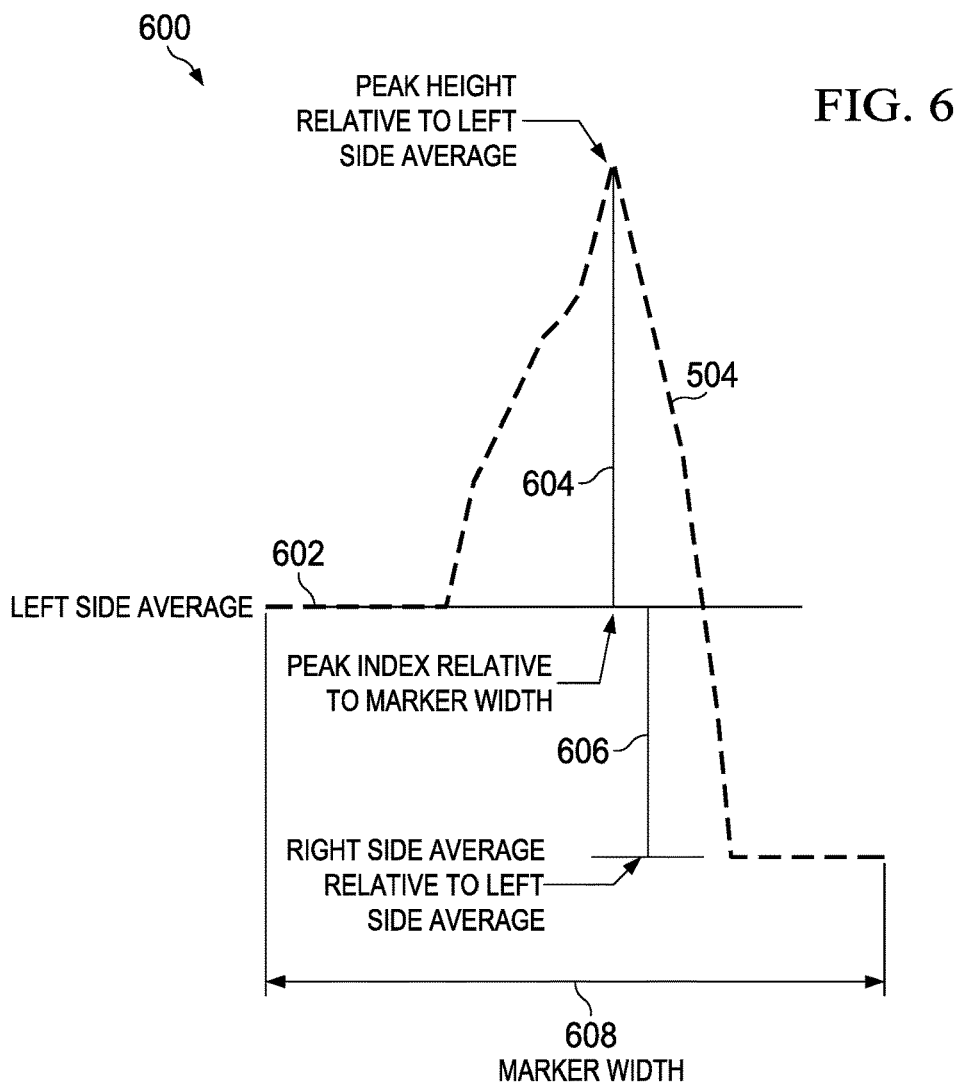
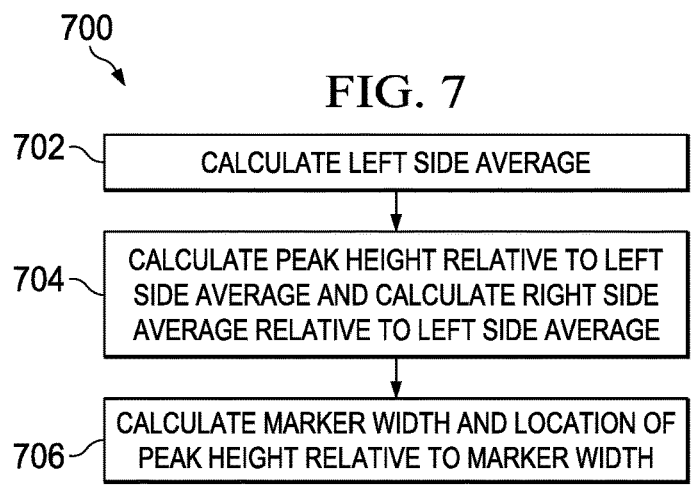

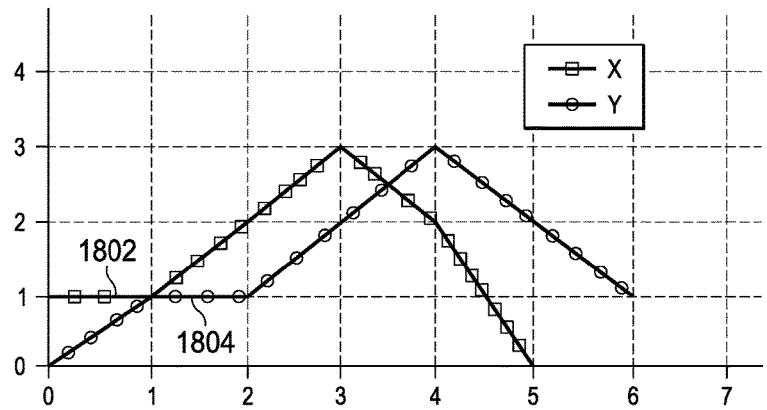
FIG. 18
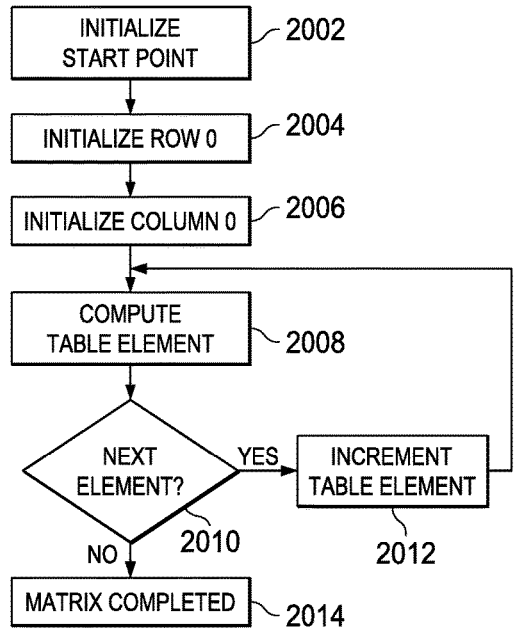
FIG. 19
FIG. 20

SYSTEM AND METHOD FOR DYNAMIC FORMATION DETECTION USING DYNAMIC DEPTH WARPING

CROSS-REFERENCE TO RELATED APPLICATIONS

This application is a continuation in part of U.S. patent application Ser. No. 15/000,104 filed Jan. 19, 2016, entitled SYSTEM AND METHOD FOR FORMATION DETECTION AND EVALUATION, which is a continuation of U.S. patent application Ser. No. 14/627,794, filed Feb. 20, 2015, entitled SYSTEM AND METHOD FOR FORMATION DETECTION AND EVALUATION, now U.S. Pat. No. 9,238,960, issued on Jan. 19, 2016, which is a continuation of U.S. patent application Ser. No. 14/332,531, filed Jul. 16, 2014, entitled SYSTEM AND METHOD FOR FORMATION DETECTION AND EVALUATION now U.S. Pat. No. 8,977,501, issued Mar. 10, 2015, which is a continuation of U.S. patent application Ser. No. 14/186,470, filed Feb. 21, 2014, entitled SYSTEM AND METHOD FOR FORMATION DETECTION AND EVALUATION, now U.S. Pat. No. 8,818,729, issued Aug. 26, 2014, which claims benefit of U.S. Provisional Ser. No. 61/838,689, filed on Jun. 24, 2013, and entitled SYSTEM AND METHOD FOR FORMATION DETECTION, the specifications of which are incorporated herein by reference in their entirety.

TECHNICAL FIELD

The following disclosure relates to directional and conventional drilling.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Current technologies and methods do not adequately address the complicated nature of drilling. Accordingly, what is needed are a system and method to improve drilling operations.

SUMMARY

The present invention, as disclosed and described herein, in one aspect thereof comprises a system and method for correlating first well log data with a previously generated well with second well log data from an actively drilling well. A identifying a starting depth is identified above a geological formation. The first well log data is dynamically gain adjusted to the second well log data. The gain adjusted first well log data is dynamically depth warped to the second well log data to correlate the first well log data with the second well log data.

BRIEF DESCRIPTION OF THE DRAWINGS

FIG. 6 illustrates one embodiment of a representation of the baseline marker of FIG. 5, FIG. 7 illustrates a flow chart of one embodiment of a method that may be used to create the representation of FIG. 6;

FIG. 18 is an example of two curves imposed on a same chart;

FIG. 19 illustrates a matrix showing distance measures between points;

FIG. 20 is a flow diagram of the process for populating the accumulated distance matrix;

DETAILED DESCRIPTION

Figure 1A:
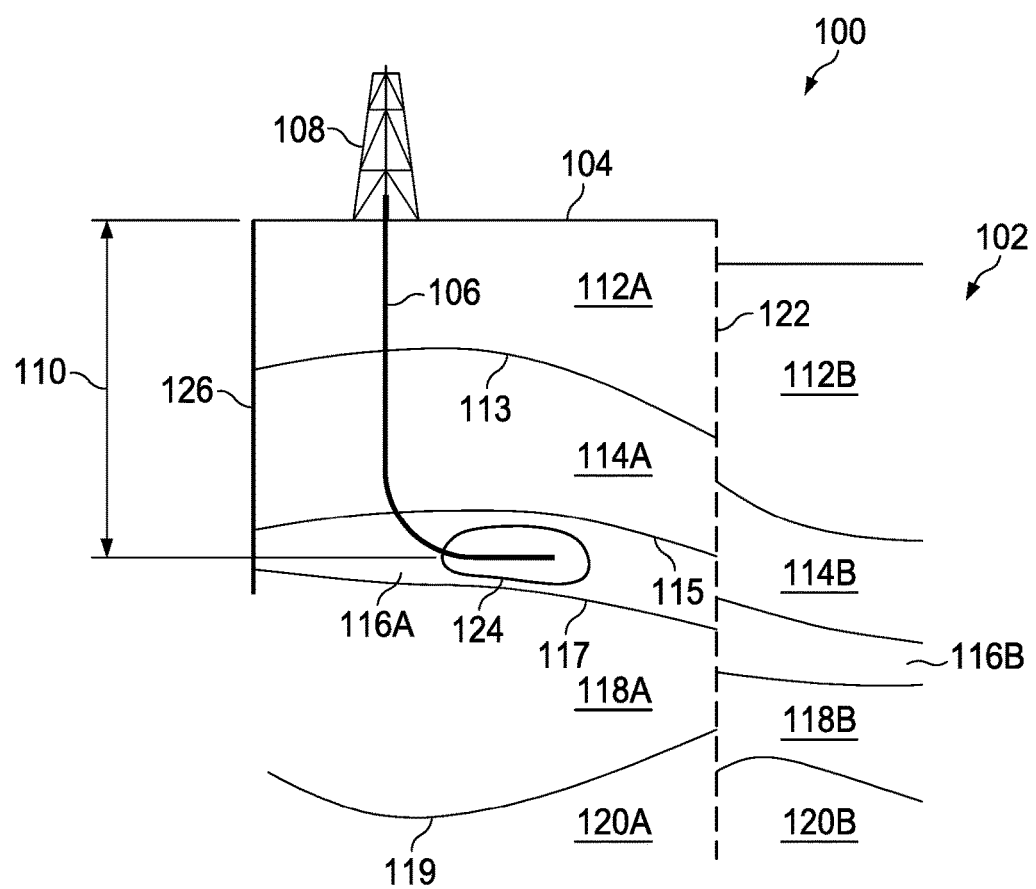
FIG. 1A illustrates one embodiment of an environment within which various aspects of the present disclosure may be implemented.

Referring now to the drawings, wherein like reference numbers are used herein to designate like elements throughout, various views and embodiments of a system and method for detecting markers within a formation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1A, one embodiment of an environment 100 is illustrated with a formation 102 having a surface 104. A borehole 106 is to be drilled or is being drilled within the formation 102 by a drilling rig 108. A drilling plan has been formulated to drill the borehole 106 to a true vertical depth (TVD) 110. The borehole 106 is to extend through strata layers 112 and 114, stop in layer 116, and not reach underlying layers 118 and 120. Layer boundary 113 separates layers 112 and 114, layer boundary 115 separates layers 114 and 116, layer boundary 117 separates layers 116 and 118, and layer boundary 119 separates layers 118 and 120. A fault 122 has shifted a portion of each layer downwards. Accordingly, the borehole 106 is located in non-shifted layer portions 112A-120A, while portions 112B-120B represent the shifted layer portions. Although not shown, it is understood that the borehole 106 may extend past the fault 122.

The borehole 106 may be directed to a target area 124 positioned in the layer 116. The target area 124 may be a subsurface point or points defined by coordinates or other markers that indicate where the borehole 106 is to end or may simply define a depth range within which the borehole 106 is to remain (e.g., the layer 116 itself). It is understood that the target area 124 may be any shape and size, and may be defined in any way. Accordingly, the target area 124 may represent an endpoint of the borehole 106 or may extend as far as can be realistically drilled. For example, if the drilling includes a horizontal component and the goal is to follow the layer 116 as far as possible, the target may simply be the layer 116 itself and drilling may continue until a limit is reached, such as a property boundary or a physical limitation to the length of the drillstring.

One or more existing wells 126 may be present in the environment 100. The existing well 126 may be an offset well or may be another well that is located relatively close to the planned borehole 106. Formation information (e.g., gamma logs) obtained from the well 126 may be used in planning the borehole 106, as well as for purposes of evaluating the drilling plan for the borehole 106 during drilling. It is understood that the location of the well 126 relative to the borehole 106 may affect the relevancy of the formation information obtained from the borehole 106. For example, the depths of the various layer boundaries 113, 115, 117, and 119 vary depending on the location of the well 126. Generally, the closer the well 126 is to the borehole 106, the more correlation there will be in the formation characteristics of the two wells. However, some exceptions may apply, such as two wells on opposite sides of the fault line 122.

In the present embodiment, the formation information includes gamma radiation readings obtained from gamma logs, which provide a record of the radioactivity of earth materials relative to depth. Accordingly, gamma logs may be used to provide some indication as to the current location of the borehole 106 (e.g., the BHA 149 of FIG. 1B) relative to the various layer boundaries 113, 115, and 117 and layers 112, 114, and 116, and may also provide information as to the approximate location of the BHA within a particular layer due to variations in radioactivity within the layer itself.

It is understood that while gamma logs containing gamma radiation readings are used for purposes of example, the present disclosure is not limited to gamma logs and other types of information, including formation information and/or drilling operational parameters indicative of changes, may be used in the various embodiments described herein in addition to, or as an alternative to, gamma information. For example, information pertaining to resistivity, porosity, pressure, neutron density, rate of penetration (ROP), and/or mechanical specific energy (MSE) may be used. Generally, the information used needs to provide enough detail to be useful in making real time or near real time adjustments to the drilling plan. Accordingly, the resolution of the information may affect the accuracy of the processes described herein.

Figure 1B:
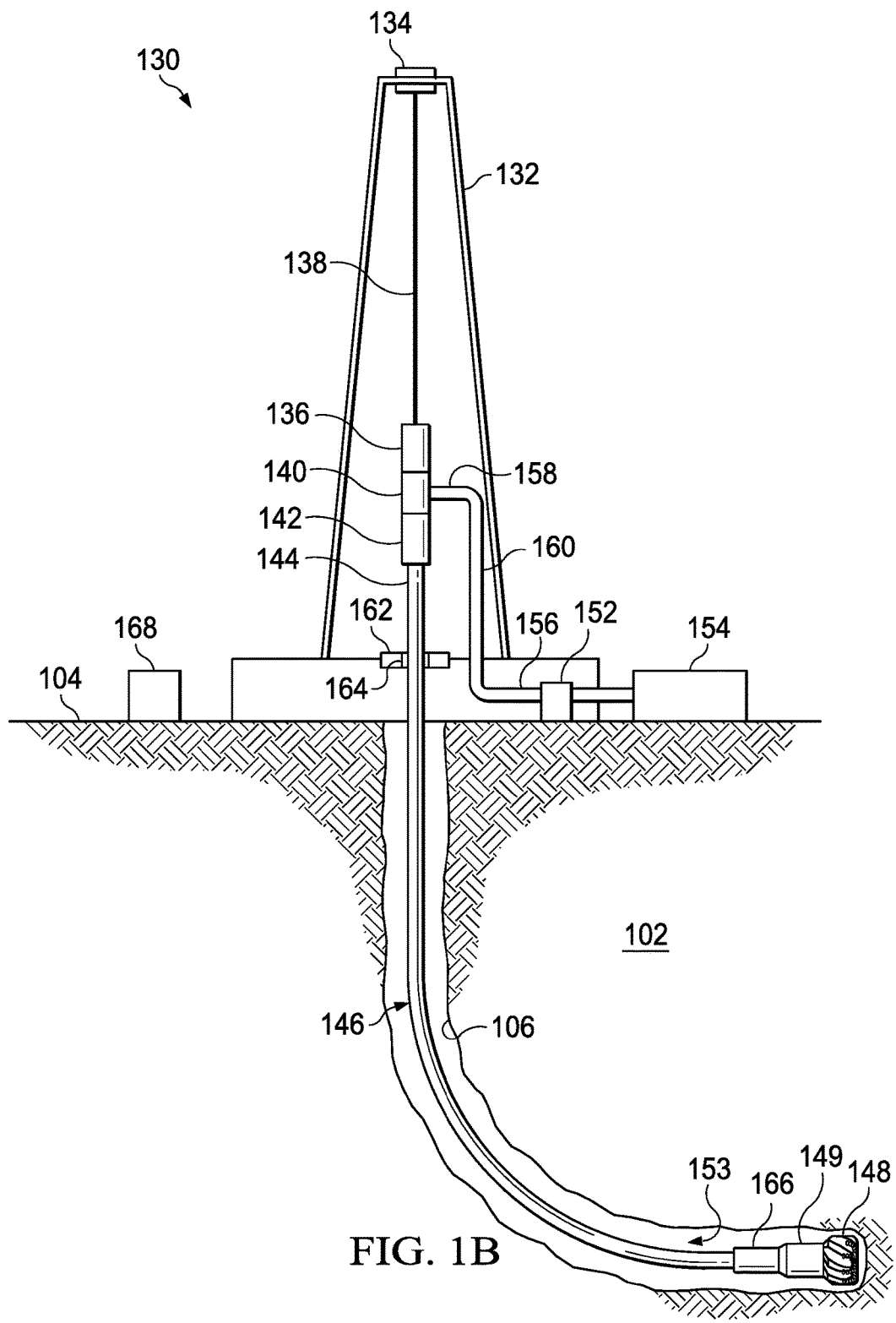
FIG. 1B illustrates one embodiment of a drilling system that may be used within the environment of FIG. 1A.

Referring to FIG. 1B, an environment 130 illustrates one embodiment of a portion of the environment 100 of FIG. 1A in greater detail. In the present example, the environment 100 includes a derrick 132 on the surface 104. The derrick 132 may be part of the drilling rig 108 of FIG. 1A. The derrick 132 includes a crown block 134. A traveling block 136 is coupled to the crown block 134 via a drilling line 138. In a top drive system (as illustrated), a top drive 140 is coupled to the traveling block 136 and provides the rotational force needed for drilling. A saver sub 142 may sit between the top drive 140 and a drill pipe 144 that is part of a drill string 146. The top drive 140 rotates the drill string 146 via the saver sub 142, which in turn rotates a drill bit 148 of a bottom hole assembly (BHA) 149 in the borehole 106 in the formation 102. A mud pump 152 may direct a fluid mixture (e.g., mud) 153 from a mud pit or other container 154 into the borehole 106. The mud 153 may flow from the mud pump 152 into a discharge line 156 that is coupled to a rotary hose 158 by a standpipe 160. The rotary hose 158 is coupled to the top drive 140, which includes a passage for the mud 153 to flow into the drill string 146 and the borehole 106. A rotary table 162 may be fitted with a master bushing 164 to hold the drill string 146 when the drill string is not rotating.

Sensing, detection, and/or evaluation functionality may be incorporated into a downhole tool 166 (which may be located in one or more positions along the drill string), BHA 149, or may be located elsewhere along the drill string 146. For example, gamma radiation sensors may be included in the downhole tool 166 and/or elsewhere along the drill string 146.

In some embodiments, formation detection and evaluation functionality may be provided via a control system 168 on the surface 104. The control system 168 may be located at the derrick 132 or may be remote from the actual drilling location. For example, the control system 168 may be a system such as is disclosed in U.S. Pat. No. 8,210,283 entitled SYSTEM AND METHOD FOR SURFACE STEERABLE DRILLING, filed on Dec. 22, 2011, and issued on Jul. 3, 2012, which is hereby incorporated by reference in its entirety. Alternatively, the control system 168 may be a stand-alone system or may be incorporated into other systems at the derrick 132. The control system 168 may receive formation information via a wired and/or wireless connection (not shown). In some embodiments, the control system 168 may use the evaluation functionality to provide convergence plans and/or other corrective measures as disclosed in U.S. patent application Ser. No. 13/530,298, entitled SYSTEM AND METHOD FOR DETERMINING INCREMENTAL PROGRESSION BETWEEN SURVEY POINTS WHILE DRILLING, and filed on Jun. 22, 2012, which is hereby incorporated by reference in its entirety. Some or all of the control system 168 may be positioned in the downhole tool 166 or may communicate with a separate controller in the downhole tool 166.

As described in U.S. Pat. No. 8,210,283 in reference to FIG. 1A, the formulation of a drilling plan for the drilling rig 110 may include processing and analyzing the collected data in the database 128 to create a more effective drilling plan. Furthermore, once the drilling has begun, the collected data may be used in conjunction with current data from the drilling rig 110 to improve drilling decisions. Accordingly, an on-site controller 144 is coupled to the drilling rig 110 and may also be coupled to the database 128 via one or more wired and/or wireless communication channel(s) 146. Other inputs 148 may also be provided to the on-site controller 144. In some embodiments, the on-site controller 144 may operate as a stand-alone device with the drilling rig 110. For example, the on-site controller 144 may not be communicatively coupled to the database 128. Although shown as being positioned near or at the drilling rig 110 in the present example, it is understood that some or all components of the on-site controller 144 may be distributed and located elsewhere in other embodiments.

The on-site controller 144 may form all or part of a surface steerable system. The database 128 may also form part of the surface steerable system. As will be described in greater detail below, the surface steerable system may be used to plan and control drilling operations based on input information, including feedback from the drilling process itself. The surface steerable system may be used to perform such operations as receiving drilling data representing a drill path and other drilling parameters, calculating a drilling solution for the drill path based on the received data and other available data (e.g., rig characteristics), implementing the drilling solution at the drilling rig 110, monitoring the drilling process to gauge whether the drilling process is within a defined margin of error of the drill path, and/or calculating corrections for the drilling process if the drilling process is outside of the margin of error.

Figure 1C:
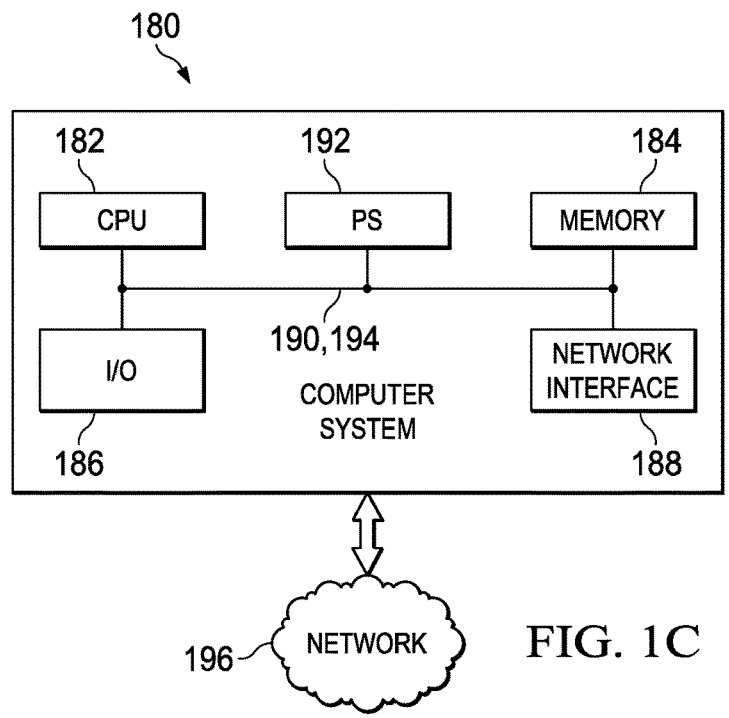
FIG. 1C illustrates one embodiment of a computer system that may be used within the environment of FIG. 1A and/or with the drilling system of FIG. 1B.

Referring to FIG. 1C, one embodiment of a computer system 180 is illustrated. The computer system 180 is one possible example of a system component or device such as the control system 168 of FIG. 1B or a separate system used to perform the various processes described herein. In scenarios where the computer system 180 is on-site, such as within the environment 100 of FIG. 1A and/or the environment 130 of FIG. 1B, the computer system may be contained in a relatively rugged, shock-resistant case that is hardened for industrial applications and harsh environments. It is understood that downhole electronics may be mounted in an adaptive suspension system or another type of dampening system.

The computer system 180 may include a central processing unit ("CPU") 182, a memory unit 184, an input/output ("I/O") device 186, and a network interface 188. The components 182, 184, 186, and 188 are interconnected by a transport system (e.g., a bus) 190. A power supply (PS) 192 may provide power to components of the computer system 180 via a power transport system 194 (shown with data transport system 190, although the power and data transport systems may be separate).

It is understood that the computer system 180 may be differently configured and that each of the listed components may actually represent several different components. For example, the CPU 182 may actually represent a multi-processor or a distributed processing system; the memory unit 184 may include different levels of cache memory, main memory, hard disks, and remote storage locations; the I/O device 186 may include monitors, keyboards, and the like; and the network interface 188 may include one or more network cards providing one or more wired and/or wireless connections to a network 196. Therefore, a wide range of flexibility is anticipated in the configuration of the computer system 180.

The computer system 180 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 180. The operating system, as well as other instructions (e.g., software instructions for performing the functionality described in various embodiments described herein) may be stored in the memory unit 184 and executed by the processor 182. For example, the memory unit 184 may include instructions for performing the various methods and control functions disclosed herein.

The network 196 may be a single network or may represent multiple networks, including networks of different types. For example, the network 196 may include one or more cellular links, data packet networks such as the Internet, local area networks (LANs), and/or wide local area networks (WLAN), and/or Public Switched Telephone Networks (PSTNs). Accordingly, many different network types and configurations may be used to couple the computer system 180 to other components of the environment 100 of FIG. 1A, the environment 130 of FIG. 1B, and/or to other systems not shown (e.g., remote systems).

Figure 2:
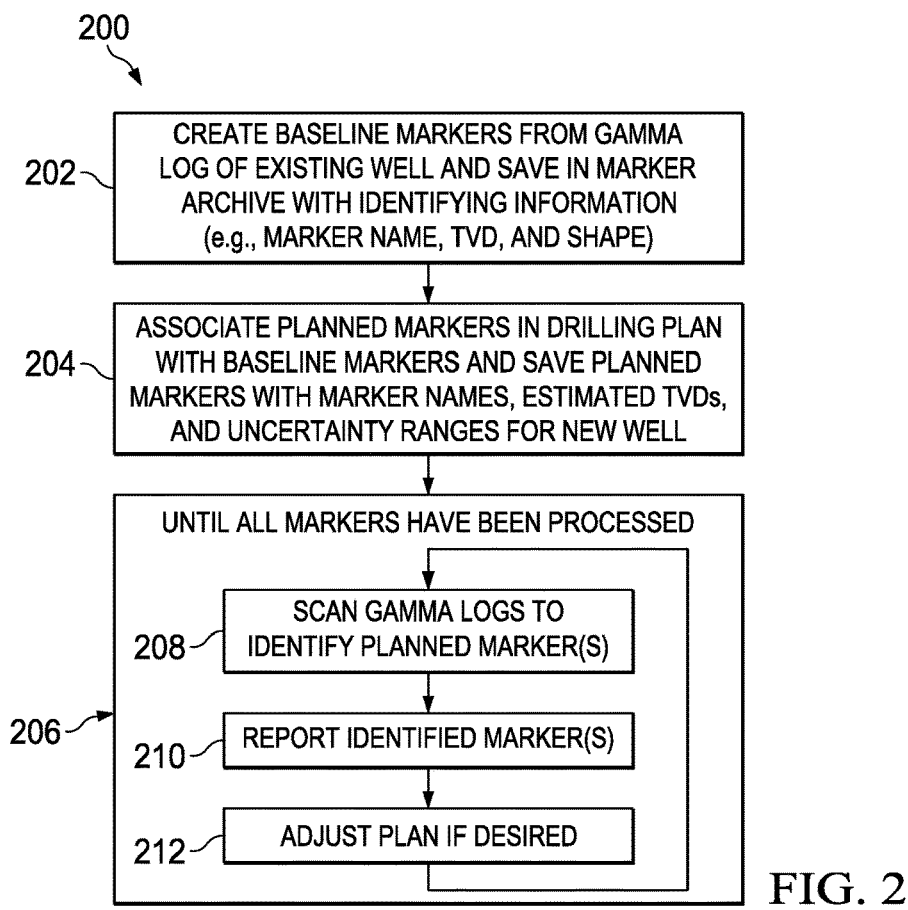
FIG. 2 illustrates a flow chart of one embodiment of a method that may be used to create baseline markers, associate the created baseline markers with planned markers, and scan for the planned markers during drilling.

Referring to FIG. 2, one embodiment of a method 200 illustrates a process that may be used to create baseline markers from formation information obtained from an existing well, associate one or more planned markers in a drilling plan with a baseline marker, identify planned markers from formation information obtained while drilling a new well, and determine whether to modify the drilling plan based on differences between the baseline markers and the planned markers. In the present example, gamma logs have been obtained from the well 126 of FIG. 1B and baseline markers from the gamma logs are used in creating or refining a drilling plan for the borehole 106. The baseline markers may also be used in evaluating the drilling plan during the drilling process.

In step 202, baseline markers are created from gamma logs obtained from the existing well 126. The baseline markers correspond to waveforms representing detected gamma values that are identifiable and distinguishable from surrounding gamma values in the logs. For example, a waveform representing a relatively significant spike in the gamma log that is surrounded by lower level readings may be selected as a baseline marker. It is understood that a baseline marker need not be a particular shape or amplitude, but may be selected at least in part based on its relation to surrounding readings.

The selection process may be performed manually by a geologist or another individual able to identify log information that would make an acceptable baseline marker (e.g., using a computer system to highlight such information and save it as a baseline marker) or may be performed automatically by a computer system. In cases where the computer system automatically identifies and saves baseline markers, a person may verify and/or modify the baseline markers at a later time. Once a particular portion of a log is identified and selected to serve as a baseline marker, the information is saved in a marker archive with corresponding data, such as name, TVD, and shape. In the present embodiment, the marker archive corresponds to the well 126, but it is understood that other storage criteria may be used in categorizing a baseline marker. For example, a baseline marker may be associated with a particular geographic area and/or a formation layer rather than with a particular well.

In step 204, planned markers are created for the drilling plan. Each planned marker is associated with a baseline marker from a marker archive, which in this example is the marker archive of the well 126. It is noted that the marker archive for the well 126 may have been created at some point in the past (e.g., for another well) and may include the original baseline markers, modified baseline markers, and/or added baseline markers. Accordingly, the marker archive may not be fixed, but may be refined over time in some cases. Information for each planned marker is entered, such as estimated TVD and an uncertainty range (e.g., plus or minus thirty feet) that may aid in minimizing or eliminating false positives. For example, if the uncertainty range is plus or minus thirty feet, there will be an uncertainty region of sixty feet. As will be described later, the uncertainty region may be used when scanning for planned markers as the borehole 106 is being drilled. While planned markers are created in step 204 in the present embodiment, it is understood that planned markers may be obtained using different methods in other embodiments, such as retrieving the planned markers from a database or automatically calculating information for a planned marker (e.g., location) as needed.

In step 206, which occurs during drilling until all markers have been processed, gamma logs are obtained and analyzed as further illustrated in sub-steps 208, 210, and 212. For example, in step 208, the gamma logs are scanned for planned markers created in step 204. The gamma logs may be obtained in real time or near real time as the formation information is gathered by downhole sensors and relayed to the surface and the log scanning may also occur in real time or near real time. In step 210, an identified planned marker is reported. This reporting may be done in real time or near real time. The real time or near real time aspect of the information gathering, scanning, and reporting enables differences between the drilling plan and the actual drilled borehole to be identified relatively quickly, thereby minimizing the time needed to correct for adjustments to the drilling plan.

In step 212, a decision may be made to adjust the drilling plan or to let drilling continue without adjustment. For example, if the planned marker is reported as being five feet lower than expected, the report may be reviewed and a decision may be made that no change is needed. However, if the planned marker is reported as being twenty feet lower than expected, the plan may be changed to compensate for this difference. For example, the TVD and/or the bed dip may be modified. It is understood that this is only an example and that many different factors may influence the decision on whether the plan is to be changed after the TVD of a planned marker is identified. This decision may occur relatively quickly following the report in order to correct the drilling plan as soon as an undesirable deviation is detected. Assuming that factors such as the timing of the report, who is monitoring the report, the authority of the person or persons monitoring the report, and the correctional capabilities of the drilling process enable corrections to be made relatively rapidly, the correction may be made before the next planned marker is found.

It is understood that processing a marker in step 206 may include skipping that marker. For example, if a marker is not identified, that marker may be skipped. A marker that coincides with a fault or another geological irregularity may simply not exist or may be so altered as to be unrecognizable. If a marker is not located and yet not skipped, the system would continue looking for that marker and miss the next marker. Such skipping may be automatic (e.g., skip a marker that is not found within fifty feet of its estimated depth) or may be manually controlled (e.g., notify a user that a marker has not been found and let the user decide whether to keep searching for the marker or skip it).

Figure 3:
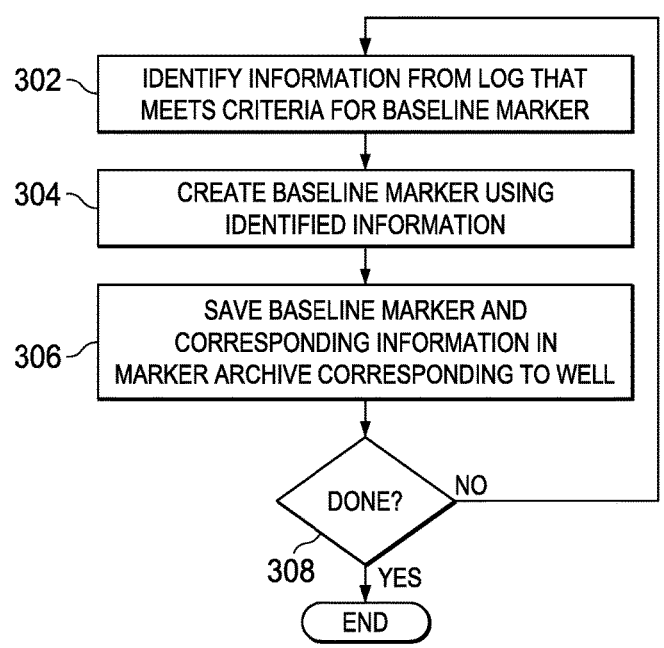
FIG. 3 illustrates a flow chart of one embodiment of a method that may be used to create baseline markers.

Referring to FIG. 3, one embodiment of a method 300 illustrates a process that may be used to identify suitable baseline markers from an existing well and store those baseline markers for later use. The method 300 may be entirely automatic (e.g., computer controlled) or may be based on user input (e.g., the selection of particular waveforms).

In step 302, information is identified from a log (e.g., a gamma log from the well 126 of FIG. 2B) that meets one or more criteria for a baseline marker. The criteria may include a minimum width and/or relative amplitude for a gamma spike, shape limitations (e.g., a spike may need to be relatively sharp rather than a gentle slope), or may need to be a shape that is readily distinguishable from other shapes. It is understood that the criteria may be relative in that a particular spike may be suitable as a baseline marker in one part of the log, but not in another part of the log. For example, a spike that is in close proximity to one or more other spikes of similar amplitude may not be suitable for a baseline marker, but a spike that is relatively isolated and/or has a significantly larger magnitude may be suitable.

Figure 4:
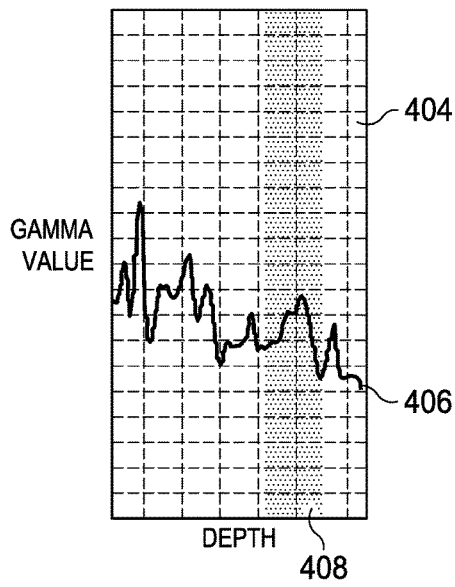
FIG. 4 illustrates one embodiment of a log file that may be used by the method of FIG. 3.

With additional reference to FIG. 4, one embodiment of a portion of a gamma log 402 is illustrated. The gamma log 402 includes a graph 404 that visually illustrates a series of gamma readings using line 406 to represent gamma radiation values and corresponding depths. In the present example, a portion 408 of the gamma log 402 has been highlighted for use as a baseline marker, as will be described with respect to the next step of FIG. 3.

Figure 5:
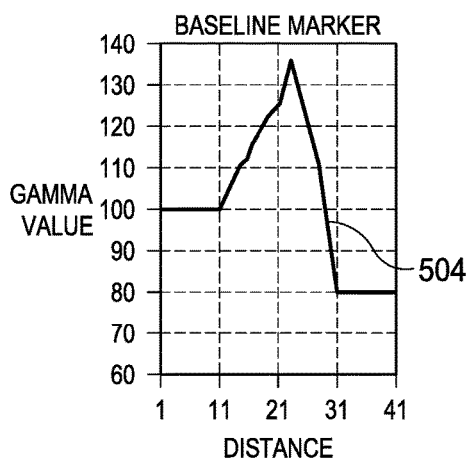
FIG. 5 illustrates one embodiment of a baseline marker that may be created from the log file of FIG. 4.

Referring again to FIG. 3, in step 304, a baseline marker is created from the selected portion of the gamma log. For example, referring to FIG. 5, one embodiment of a chart 502 provides a representation of a baseline marker 504. The baseline marker 504 is shown against an axis representing the gamma value and an axis representing the distance (e.g., width) of the baseline marker 504. It is understood that this information is derived from the gamma log 402 of FIG. 4, with the width being calculated based on the depth at which the particular points of the baseline marker 504 appear on the gamma log 402. It is further understood that the baseline marker 504 may be an exact match of the waveform from the gamma log 402 or may be a waveform representation (e.g., may be based on the waveform but not an exact representation).

With additional reference to FIGS. 6 and 7, embodiments of a diagram 600 (FIG. 6) and method 700 (FIG. 7) illustrate a waveform representation of a baseline marker (e.g., the baseline marker 504 of FIG. 5) and how such a waveform representation may be constructed. It is understood that the waveform representation is one example of a mathematical representation (e.g., a fingerprint) of the baseline marker 504. It is further understood that this is only one example of how fingerprinting may occur for a baseline marker and that many other representations may be used. In addition, while described with respect to the method 300 of FIG. 3, it is understood that the representation may be constructed as part of one or more other processes, such as during the creation of fingerprints for new wells as will be described later.

As illustrated in FIG. 6, in the present example, the waveform representation includes a line 602 that represents the left side average of the baseline marker 504. A line 604 represents the peak height relative to the left side average. A line 606 represents the right side average relative to the left side average. A line 608 represents the width of the baseline marker. The width may vary based on the portion of the gamma log selected as the baseline marker 504. The position of the line 604 with respect to the line 608 represents the location of the peak index relative to the width of the baseline marker. It is understood that this waveform representation is primarily constructed using relative values to meet the challenge of identifying a planned marker even when changes have occurred in amplitude, width, shape, and/or other characteristics.

In general, measured amplitudes may be handled carefully due to differences in sensors. For example, a comparison between the recorded amplitude of a baseline marker and the recorded amplitude of a planned marker cannot be relied upon when the gamma radiation sensors are not calibrated relative to one another. Accordingly, while amplitude may be used in the selection of baseline markers and the later comparison of baseline markers and planned markers, the present disclosure generally uses relative amplitude (e.g., relative to the left side average) rather than absolute amplitude. In embodiments where the sensors are known to be calibrated relative to one another and/or where the recorded sensor results can be adjusted to account for sensor differences, absolute amplitude may be relied upon more heavily.

It is understood that a waveform representation may have many different characteristics. For example, a multi-peak waveform representation may be used (with or without averaging the peaks). This may be particularly useful in build and lateral sections of the borehole where the waveform is rotated rather than being vertical. This may also be useful when the log file can be read in two directions (e.g., forward and backward) as having at least two peaks to read may provide insight into which direction the log file is being read since the order in which the peaks are identified will be different depending on the direction in which the log file is read.

While the present disclosure is described using vertical sections of the borehole 106, it is understood that the concepts described herein may also be applied to horizontal and build sections. Although some differences may exist between vertical, horizontal, and build sections, the basic process of using baseline markers and planned markers to assess the accuracy of drilling in real time or near real time and to make corrections if needed remains the same.

As illustrated in FIG. 7, the method 700 may be used to construct the waveform representation of FIG. 6. In step 702, the left side average is calculated. It is understood that the left side average may be used because the gamma log generally follows a pattern of descending depth. This means that the left part of the log (e.g., the "top" of the log representing shallower depths) will be scanned first during real time or near real time scanning. Accordingly, the first part of a baseline marker to be scanned will typically be the left side of the baseline marker. It is understood that this process may be performed differently (e.g., scanning from right to left) and would still be covered by the current description, but scanning from left to right (e.g., shallower depths to deeper depths) is the general process used for this example.

The left side average may be calculated in many ways. For example, the left side average may be a single average value from the left side of the marker to the peak. In other embodiments, there may be multiple averages. For example, a stair step or multi-peak average may be used. The right side average may be calculated in the same way as the left side average or in a different way. Furthermore, the averaging process may vary depending on the particular shape and/or width of the portion of the waveform being averaged.

In step 704, the peak height and the right side average are calculated relative to the left side average. For example, continuing the example of FIG. 5, the left side average may be a gamma reading of 100. The peak height is 135 and the right side value is 80. The peak height relative to the left side average would be 1.35. The right side average relative to the left side would be 0.80.

In step 706, the width of the baseline marker is calculated and the location of the peak height relative to the width is calculated. The width may be calculated by subtracting the TVD of the right side from the TVD of the left side. The location of the peak height may then be identified. For example, if the width is forty-one feet, the location of the peak can be calculated as whatever value matches the location of the peak height. It is noted that the use of relative values and averages enables a possible match between two waveforms to be described in terms of a percentage, as an exact match is unlikely to occur. For example, the use of relative values addresses discrepancies that might otherwise exist between two waveforms due to sensors not being calibrated with respect to one another, as well as formation to formation discrepancies. A more detailed example of this process is discussed later.

Referring again to FIG. 3, in step 306, the baseline marker and corresponding information (e.g., name and waveform representation (as the actual waveform and/or as calculated representation values) are stored in the baseline marker archive corresponding to the well with which the gamma log is associated. In step 306, a determination may be made as to whether the method 300 has finished (e.g., whether additional baseline markers are to be selected from the gamma log). If the determination indicates that the method 300 is not finished, the method returns to step 302. If the determination indicates that the method 300 is finished, the method ends.

Figure 8:
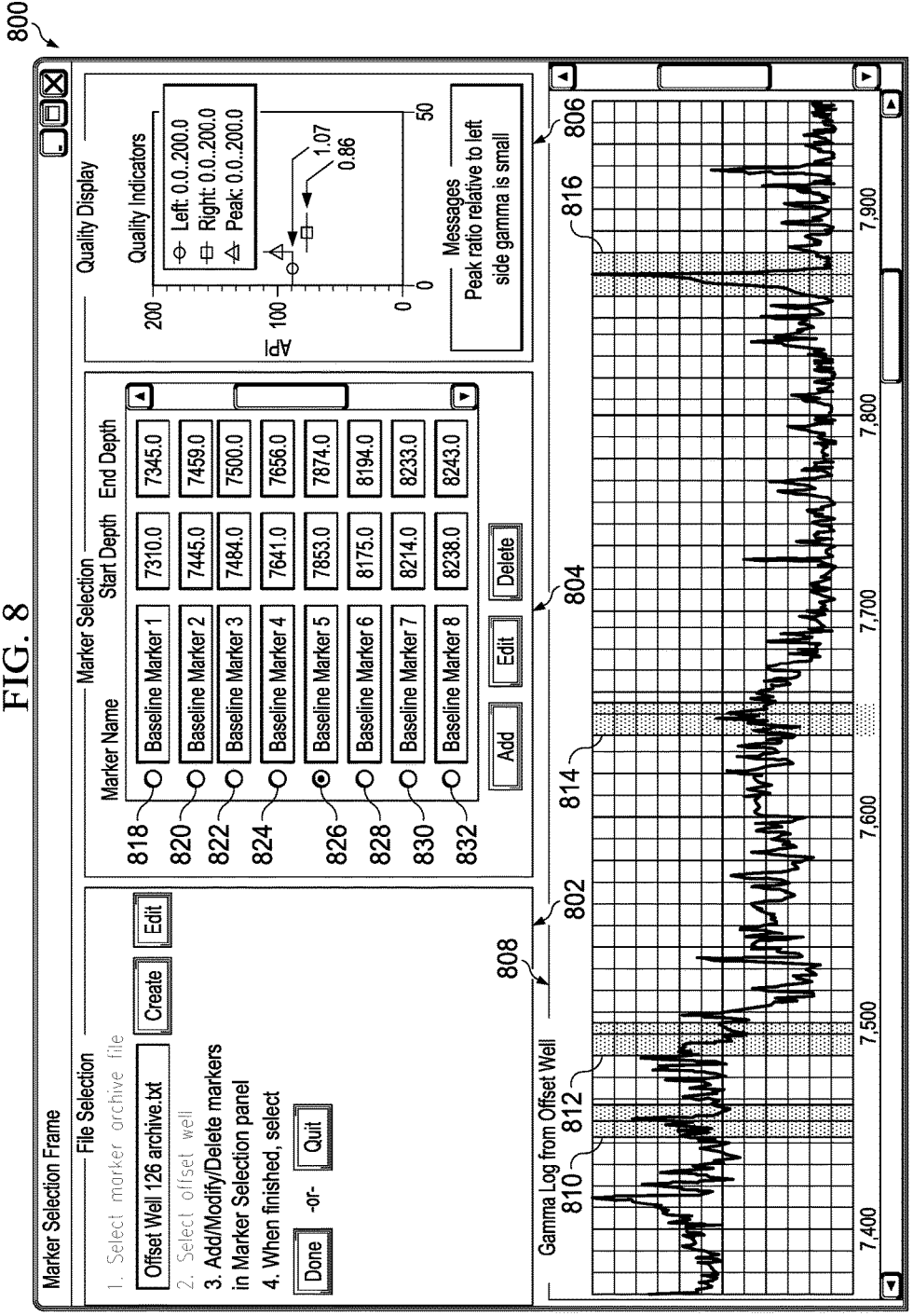
FIG. 8 illustrates one embodiment of a graphical user interface that may be used to interact with the method of FIG. 4.

Referring to FIG. 8, one embodiment of a GUI 800 illustrates an interface that may be used to retrieve a log file and add, edit, or delete baseline markers. It is understood that the GUI 800 is for purposes of example and that many different GUIs may be used to provide some or all of the functionality shown with the GUI 800. In the present example, the GUI 800 includes a file selection panel 802, a marker selection panel 804, a quality display panel 806, and a gamma log panel 808.

In operation, a user may create or edit a marker archive file using section 802. In the present example, the marker archive file is "Offset Well 126 archive.txt," which corresponds to the offset well 126 of FIG. 1A. A corresponding offset well may be associated with the offset well if that has not already been done. The user may then highlight (e.g., using a mouse, keyboard, and/or other interfaces) one or more sections of the gamma log. As these are highlighted, they are added to the marker selection panel 804. For example, the illustrated portion of the gamma log includes four selected portions 810, 812, 814, and 816. The marker selection panel 804 illustrates eight markers 818, 820, 822, 824, 826, 828, 830, and 832, each of which has a name, a start depth, and an end depth. The start depth and end depth may be automatically entered based on the corresponding selected portion. For purposes of illustration, the selected portion 810 corresponds to marker 820, the selected portion 812 corresponds to marker 822, the selected portion 814 corresponds to marker 824, and the selected portion 816 corresponds to marker 826.

The quality display panel 806 contains quality indicators that illustrate a quality level of the currently selected marker. The quality level represents the strength of the selected marker. For example, the quality display panel 806 may include a graph that illustrates a qualitative analysis of the difference between the right side average and the left side average, as well as the difference between the left side average and the peak. The selected widths are also illustrated. Using this feedback, a user can select the marker differently to strengthen these attributes.

In the present example, the quality display panel 806 plots left, right, and peak values against a vertical axis measured in API (the unit of radioactivity used for gamma logs) and a horizontal axis measured in width. The width may be represented as TVD in some embodiments. It is noted that in offset logs, the TVD generally equals the measured depth unless the log is a TVD converted log. A messages section may be used to comment on the quality of the currently selected marker. For example, the current message indicates that the peak value is small relative to the left side value.

Accordingly, using the GUI 800, a user can scroll through a gamma log, select portions of the gamma log, and save those portions as baseline markers. In addition, previously saved baseline markers can be edited or deleted.

Figure 9:
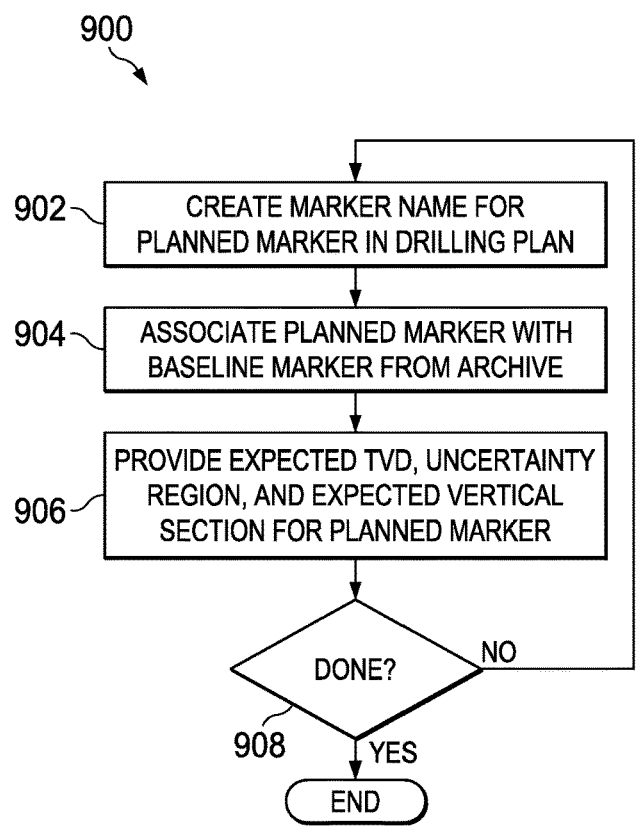
FIG. 9 illustrates a flow chart of one embodiment of a method that may be used to create planned markers and associate them with baseline markers.

Referring to FIG. 9, one embodiment of a method 900 illustrates a process that may be used to create planned markers for a drilling plan for a new well and associate each planned marker with a corresponding baseline marker from an existing well. For example, using the environment 100 of FIG. 1A, a drilling plan is being created or revised for the borehole 106.

Baseline markers have been created for the offset well 126 and those baseline markers are available for use in the planning of the borehole 106. While there may be variations between the baseline markers and the planned markers once the planned markers are actually located in the borehole 106 (e.g., differences in TVD, gamma levels, and/or shape) due to differences between the two locations within the formation 102, the baseline markers provide at least some knowledge of where the planned markers may appear.

In step 902, a marker name is created for a new planned marker. In step 904, the planned marker is associated with a baseline marker from the marker archive of the offset well 126. For example, assume that a planned marker will likely occur at the layer boundary 113. This planned marker may then be associated with a baseline marker from the offset well 126 that is located at the layer boundary 113.

In step 906, an estimated depth, an uncertainty region, and an expected vertical section may be provided for the planned marker (e.g., entered or imported from a database or other memory). The estimated depth may be based on other information, such as general knowledge of the formation 102 (e.g., whether the boundary layer 113 is level, rising, or falling between the offset well and the planned borehole 106). It is understood that such information may be gathered from other offset wells, other wells, and/or other types of survey information, and may be gathered both locally and over a relatively large region. For example, databases that may contain such information are described previously incorporated U.S. Pat. No. 8,210,283 entitled SYSTEM AND METHOD FOR SURFACE STEERABLE DRILLING.

The uncertainty region provides an estimated region in which the planned marker may be found (e.g., plus or minus twenty feet). The expected vertical section provides a reference to the drilling plan and more specifically identifies a particular vertical section of the plan in which the planned marker is likely to be located. It is understood that more or less information may be provided. For example, the expected vertical section may be omitted in some embodiments.

Further adjustments may be made if needed. For example, if the waveform representation is calculated based on the appearance of a waveform in a vertical section, but it is estimated that the marker will be identified in a build section in the current borehole, then the waveform representation must likely be modified or it will be missed. Accordingly, compensations may be made based on factors such as where a particular waveform representation is expected to be located in the current borehole.

In step 908, a determination may be made as to whether the process has finished (e.g., whether there are more planned markers to create). If the process is not finished, the method 900 returns to step 902. If the process is finished, the method 900 ends.

Figure 10:
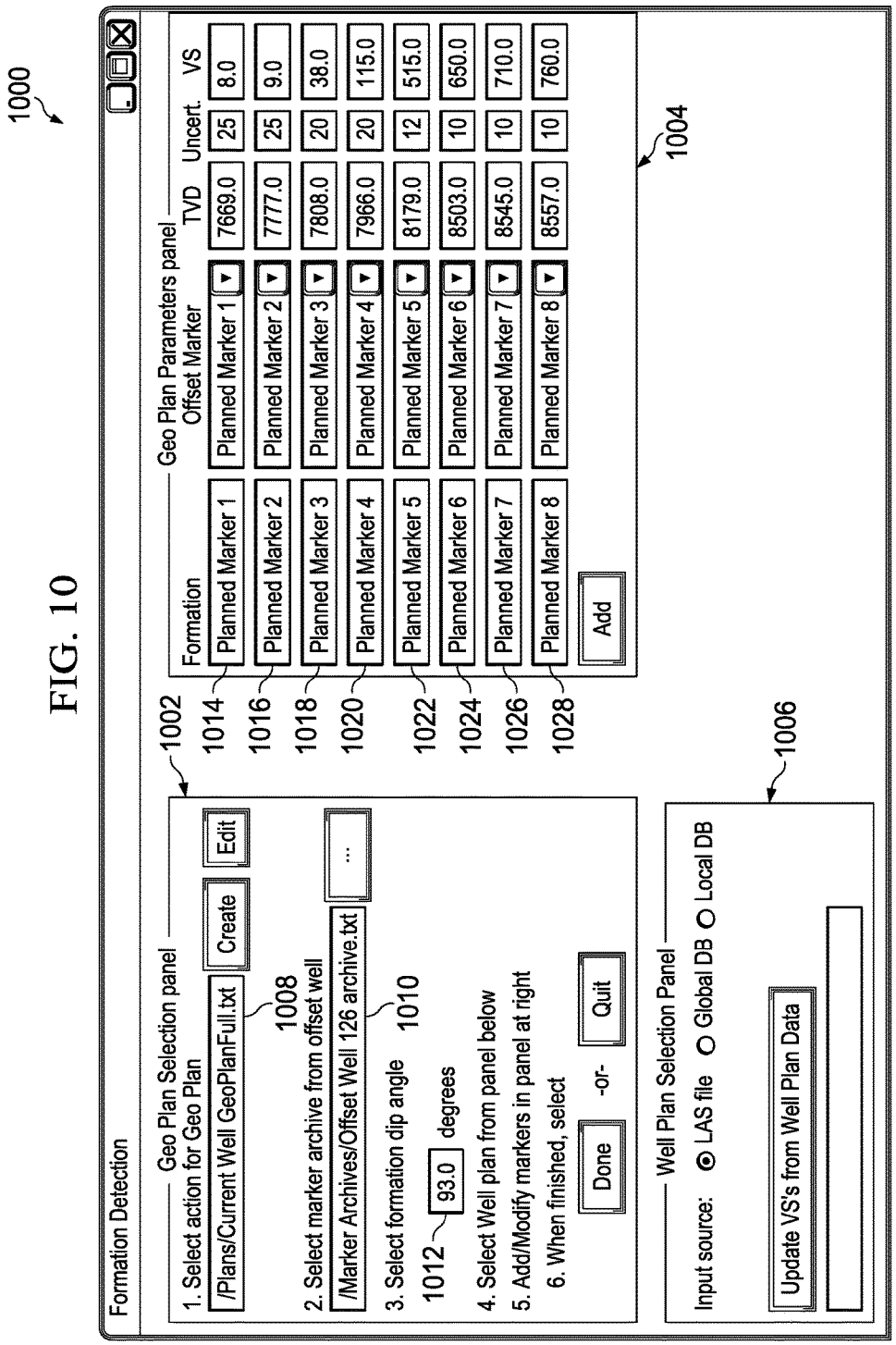
FIG. 10 illustrates one embodiment of a graphical user interface that may be used to interact with the method of FIG. 9.

Referring to FIG. 10, one embodiment of a GUI 1000 illustrates an interface that may be used to create and/or edit planned markers for a drilling plan. It is understood that the GUI 1000 is for purposes of example and that many different GUIs may be used to provide some or all of the functionality shown with the GUI 1000. In the present example, the GUI 1000 includes a geo plan selection panel 1002, a geo plan parameters panel 1004, and a well plan selection panel 1006.

In operation, a user may create or edit a geo plan for the borehole 106 via text box 1008 and associated control buttons. In the present example, the geo plan is named "Current Well Geo Plan Full.txt." The user may also select a marker archive as illustrated by text box 1010. In the present example, the marker archive is the "Offset Well 126 archive.txt" described with respect to FIG. 8. A formation dip angle may be entered in text box 1012. In some embodiments, a dip angle may be suggested for the user based on identified trends, current/next markers, and/or similar factors. A well plan may be selected from the well plan selection panel 1006 from any of multiple sources, such as a Log ASCII Standard (LAS) file, a global database, or a local database. It is understood that the geo plan, marker archive, and/or well plan may be pulled from storage, either local or online (e.g., from a remotely accessible database or a server cloud).

For purpose of example, the geo plan parameters panel 1004 illustrates eight planned markers 1014, 1016, 1018, 1020, 1022, 1024, 1026, and 1028. Each planned marker corresponds to one of the baseline markers 818, 820, 822, 824, 826, 828, 830, and 832 of FIG. 8, with planned marker 1014 corresponding to baseline marker 818, planned marker 1016 corresponding to baseline marker 820, planned marker 1018 corresponding to baseline marker 822, planned marker 1020 corresponding to baseline marker 824, planned marker 1022 corresponding to baseline marker 826, planned marker 1024 corresponding to baseline marker 828, planned marker 1026 corresponding to baseline marker 830, and planned marker 1028 corresponding to baseline marker 832.

Each planned marker 1014, 1016, 1018, 1020, 1022, 1024, 1026, and 1028 is also associated with an estimated TVD, an uncertainty range, and an estimated vertical section. For example, the planned marker 1022 has been assigned an estimated TVD of 8179 feet with an uncertainty range of plus or minus twelve feet. It is expected to appear in vertical section five hundred and fifteen of the drilling plan. Accordingly, using the corresponding baseline marker 826 of FIG. 8 taken from the portion 816, a gamma log of the borehole 106 may be scanned to find the planned marker 1022. It is noted that the estimated vertical section is not needed if the log is converted to Kelly bushing TVD (KBTVD) references.

The estimated TVD, uncertainty range, and/or the estimated vertical section may provide benchmarks for determining the accuracy of the well plan and/or may be used to focus more detailed scanning on a particular section. For example, rather than scan each foot (or whatever resolution is selected) for a fingerprint, the system may skip or more rapidly scan portions of the gamma log that are unlikely to contain planned markers and focus on portions of the gamma log more likely to contain such markers.

Figure 11:
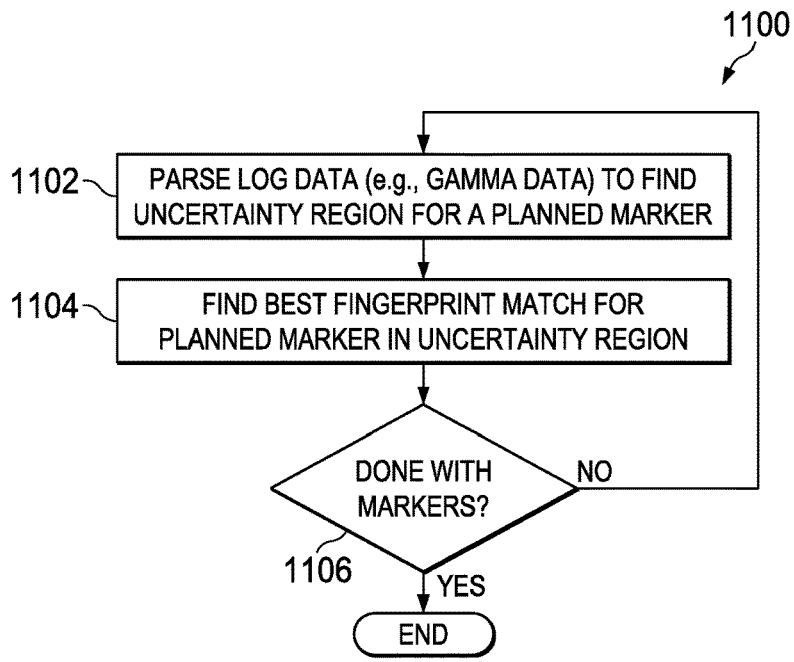
FIG. 11 illustrates a flow chart of one embodiment of a method that may be used to parse log data and identify planned markers.

Referring to FIG. 11, one embodiment of a method 1100 illustrates a process that may be used to scan a log for planned markers. In the present example, the log is a gamma log from the borehole 106 of FIG. 1A, but it is understood that other types of logs may be used.

In step 1102, log data collected as the borehole 106 is drilled is parsed. The parsing may be performed in many different ways, including scanning the log file at each foot or using another defined resolution increment, scanning for an uncertainty section, scanning for a vertical section, and/or scanning using other parameters. For example, scanning for the planned marker 1022 (FIG. 10) may involve rapidly scanning to 8167 feet (i.e., the planned TVD of 8179 minus the uncertainty range of twelve feet) and then examining the log file more closely for the planned marker. In step 1104, the best fingerprint match for the planned marker is identified for the uncertainty region. For example, there may be multiple matches or at least multiple possible matches, and the method 1100 may select the best match.

In step 1106, a determination may be made as to whether the process has finished (e.g., whether more markers remain to be found). If the process is not finished, the method 1100 returns to step 1102. If the process is finished, the method 1100 ends.

Figure 12A:
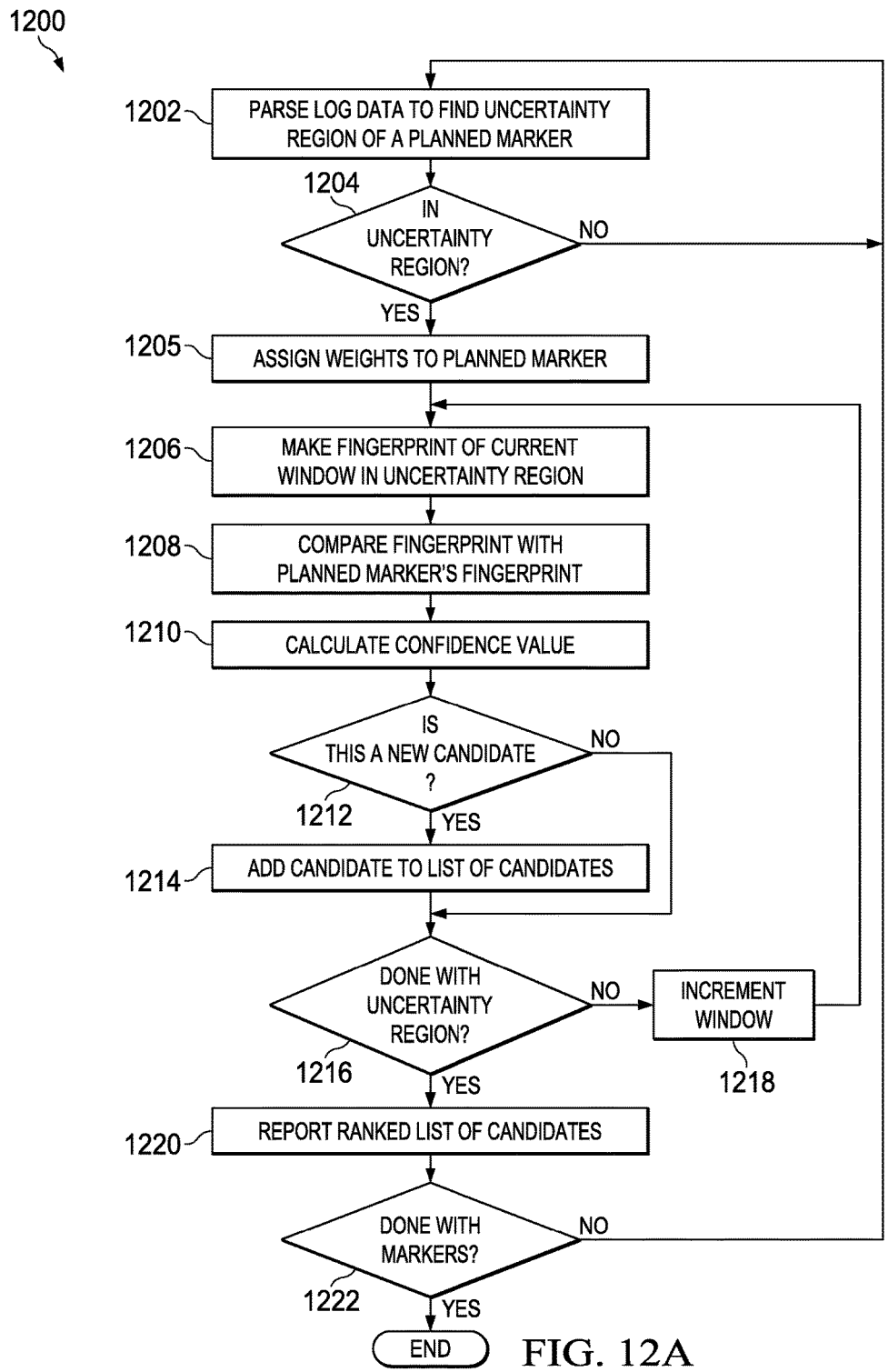
FIG. 12A illustrates a flow chart of one embodiment of a more detailed example of the flow chart of FIG. 11.

Referring to FIG. 12A, one embodiment of a method 1200 illustrates a more detailed example of the method 1100 of FIG. 11. In step 1202, log data is parsed to identify an uncertainty region. In step 1204, a determination may be made as to whether an uncertainty region has been found. If no uncertainty region has been found, the method 1200 returns to step 1202. If an uncertainty region has been found, the method 1200 continues to step 1205. In step 1205, weights are assigned to the planned marker.

In step 1206, a fingerprint is made of the current window of the uncertainty region. For example, if the planned marker is twenty feet wide, the current window may be a twenty foot window. The system would make a fingerprint of this window (as described previously).

In step 1208, the fingerprint of the current window is compared to the planned marker's fingerprint. In step 1210, a confidence value is calculated based on the comparison of step 1208. In step 1212, a determination is made as to whether the current fingerprint is a new candidate based on the TVD location of the peak. If the current fingerprint is a new candidate, the method 1200 adds the candidate to a list of candidates in step 1214 before moving to step 1216. If the current fingerprint is not a new candidate, the method 1200 continues to step 1216 without adding to the candidate list.

In step 1216, a determination may be made as to whether the method 1200 is done with the current uncertainty region. If the method 1200 is not done with the uncertainty region, the method 1200 increments the window in step 1218 and returns to step 1206. For example, if the window has a one foot resolution, the window's position will be incremented by one foot (e.g., the window will move forward one foot). If the method 1200 is done with the uncertainty region, the method 1200 moves to step 1220, where the list of candidates may be reported. This enables a user to review and select a best match from all possible candidates. In some embodiments, the list may be ranked based on the level of confidence and/or other criteria.

In step 1222, a determination may be made as to whether the process has finished (e.g., whether more of the log is to be scanned). If the process is not finished, the method 1200 returns to step 1202. If the process is finished, the method 1200 ends.

Figure 12B:
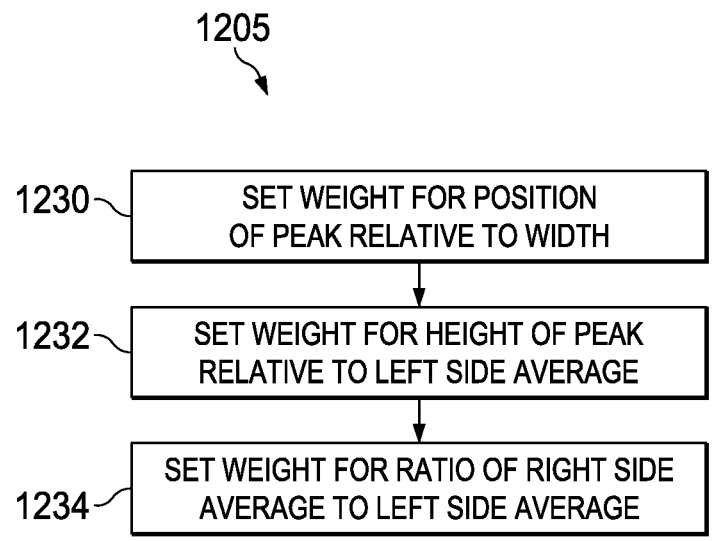
FIG. 12B illustrates a flow chart of one embodiment of a more detailed example of one step of the flow chart of FIG. 12A.

Referring to FIG. 12B, a more detailed embodiment of step 1205 of FIG. 12A is illustrated. As described previously, the best match between a reference marker and the current window in the active gamma log is needed. To accomplish this, a fingerprint matching process is used to turn gamma samples into fingerprints to improve the matching success rate. This is expressed as a multistep approach in FIG. 12B as follows.

The fingerprint matching process compares attributes between two fingerprints (e.g., a reference fingerprint and a candidate fingerprint) and produces a score based on the comparison. The fingerprint matching process considers three primary attributes in the comparison of fingerprints and provides their relative weights in the final score as follows:

| | |
|---|---|
| PIW: | 0.5 |
| PRD: | 0.2 |
| RRD: | 0.3 | where PIW=peak index weight, PRD=peak relative distance, and RRD=right relative distance. It is understood that other values may be used for relative weighting and the provided values are only for purposes of example. Prior to scanning an uncertainty region, the fingerprint matching process saves the relative weights of the reference fingerprint.

In step 1230, the weight is set for the position of the peak relative to the width. For example, if a fingerprint has a width of ten (10) and the peak is in index five (5), then the highest match will occur if a sample has its peak at index five. Each index location further from the peak index will have a lower factor (e.g., indexes 4, 3, 2, and 1 would have successively lower factor values). This is expressed as follows:

$$lc=\max(rc, ltc) \quad \text{(Equation 1)}$$

$$pif_{ref}=100.0-(lc+1) \quad \text{(Equation 2)}$$

where lc=largest count, rc=right count, ltc=left count, and $pif_{ref}$=peak index factor of the reference fingerprint.

In step 1232, the weight is set for the height of the peak relative to the left side average. For example, if the left average is 80 API and the peak is 120 API, then the peak relative distance is 0.5. This is expressed as $$prd_{ref}=(pd/la)-1.0 \quad \text{(Equation 3)}$$

where $prd_{ref}$=peak relative distance of the reference fingerprint, pd=peak distance of the relative fingerprint, and la=left side average of the relative fingerprint.

In step 1234, the weight is set for the ratio of the right side average relative to the left side. For example, if the left average is 80 API and the right average is 60 API, then the right relative distance is −0.25. This is expressed as $$rrd_{ref}=(ra/la)-1.0 \quad \text{(Equation 4)}$$

where ra=right side average of the reference fingerprint and $rrd_{ref}$=right side relative distance to the left side average of the reference fingerprint.

Figure 12C:
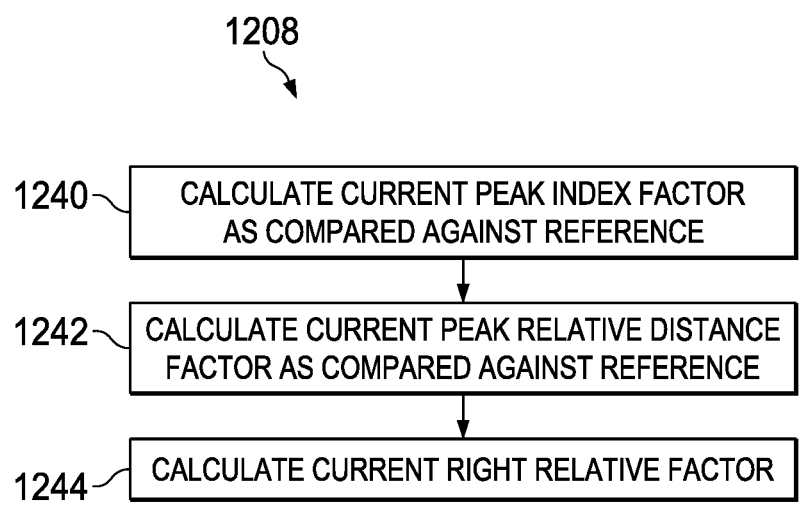
FIG. 12C illustrates a flow chart of one embodiment of a more detailed example of one step of the flow chart of FIG. 12A.

Referring to FIG. 12C, a more detailed embodiment of step 1208 of FIG. 12A is illustrated. When a candidate fingerprint (also referred to herein as a "current" fingerprint) is created from the current window of gamma data in the uncertainty region, a score is computed when the candidate fingerprint is compared against the reference fingerprint. To compute the score, the fingerprint matching process must first determine the match value of each attribute of the candidate fingerprint. This is expressed as a multistep approach in FIG. 12C as follows.

In step 1240, the current peak index factor ($pif_{cur}$) as compared against the reference ($pif_{ref}$) is calculated, which is expressed as $$Pif_{cur}=100.0-abs(pcl_{cur}-Pcl_{ref})*mif_{ref} \quad \text{(Equation 5)}$$

where $pif_{cur}$=peak index factor of the current fingerprint and $pcl_{cur}$=peak count location of the current fingerprint.

In step 1242, the current peak relative distance factor as compared against the reference ($prd_{ref}$) is calculated, which is expressed as $$prf_{cur}=\min(100.0,(prd_{cur}-1.0)/prd_{ref}*100.0) \quad \text{(Equation 6)}$$

where $prf_{cur}$=peak relative factor of the current fingerprint and $prd_{cur}$=peak relative distance to the left side average of the current fingerprint.

In step 1244, the current right relative factor is calculated, which is expressed as $$rrf_{cur}=((rrd_{cur}-1.0)/rrd_{ref})*100.0 \quad \text{(Equation 7)}$$

where $rrf_{cur}$=right relative factor of the current fingerprint and $rrd_{cur}$=right relative distance to the left side average of the current fingerprint.

Referring again to FIG. 12A, in step 1210, the overall score can now be calculated as:

$$score=(PIW*pif_{cur})+(PRD*prf_{cur})+(RRD*rrf_{cur}) \quad \text{(Equation 8)}$$

As described previously, the fingerprint matching process calculates a score for each increment of an uncertainty region. When the process completes the uncertainty region, the scores are ranked and a list of candidates is provided to a user. The ranking may use any criteria, but the scores are ranked with the highest score listed first for purposes of example.

Figure 13A:
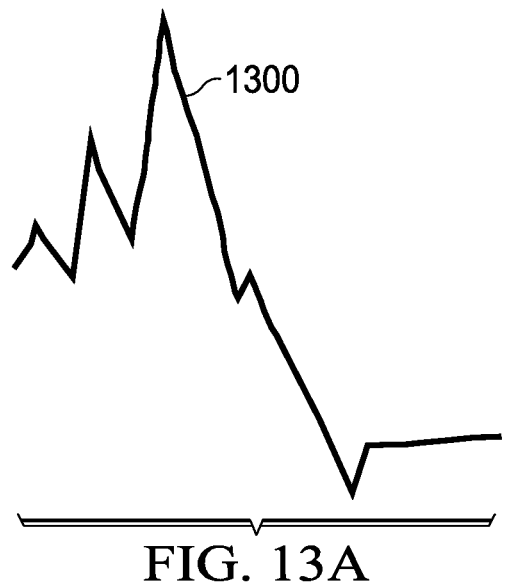
FIGS. 13A-13D illustrate diagrams of embodiments of a reference fingerprint and candidate fingerprints that may be obtained from an uncertainty region and compared against the reference fingerprint.
Figure 13B:
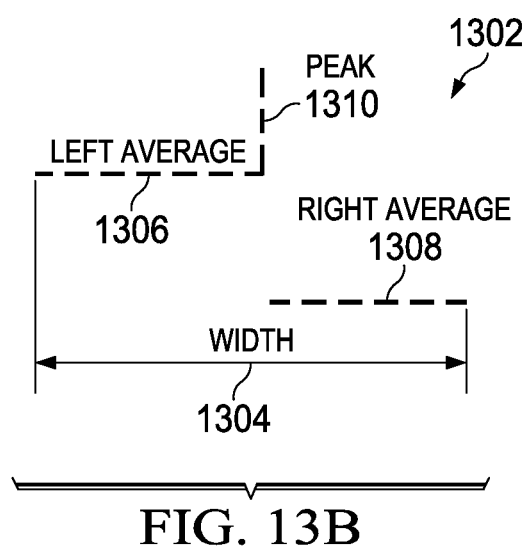
Figure 13C:
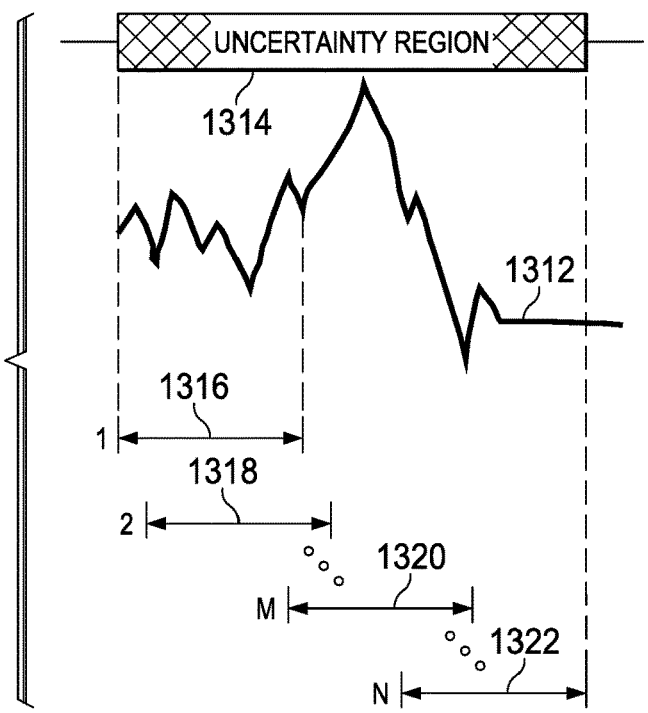

Referring to FIGS. 13A-13C, an embodiment of a process for searching for a reference fingerprint in an uncertainty region is illustrated visually. It is understood that FIGS. 13A-13C are not necessarily drawn to scale, but are provided to visually illustrate the overall process of comparing candidate fingerprints against reference fingerprints.

A reference waveform representation 1300 (FIG. 13A) is broken down into basic elements that form a reference fingerprint 1302 (FIG. 13B). As described with respect to FIG. 6, the reference fingerprint 1302 may be broken down into particular parts, such as a width 1304, a left side average 1306, a right side average 1308, and a peak 1310 that has height and index attributes. These parts and corresponding calculations have been described in detail above and are not described in the present example.

As illustrated in FIG. 13B, from a visual perspective, the left side average 1306 is relatively high compared to the right side average 1308. The peak index is approximately at the midpoint of the width 1304. These components describe the reference fingerprint 1302 for which an uncertainty region will be scanned.

As illustrated in FIG. 13C, a waveform 1312 (e.g., from a gamma log) falls within an uncertainty region 1314. The width of the uncertainty region 1314 is greater than the width of the reference fingerprint 1302 and so multiple search windows will be scanned to try to identify the reference fingerprint 1302. In the present example, the search windows begin with a search window 1316 at depth "1", include a search window 1318 at depth "2" and a search window 1320 at depth "m", and end with a search window 1322 at depth "n". Other search windows may be included based on the size of the uncertainty region and the width of the reference fingerprint 1302. It is understood that the depth may be the actual depth (e.g., 7232 feet) or may be an index based on the uncertainty region 1314 (e.g., the first search window in the uncertainty region) or another baseline.

Figure 13D:
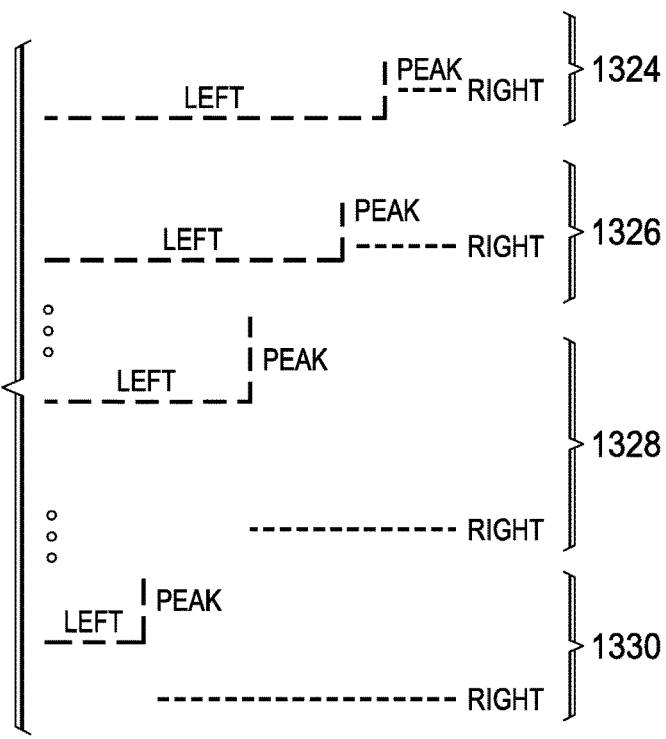

As illustrated in FIG. 13D, the search window 1316 corresponds to a candidate fingerprint 1324, the search window 1318 corresponds to a candidate fingerprint 1326, the search window 1320 corresponds to a candidate fingerprint 1328, and the search window 1322 corresponds to a candidate fingerprint 1330.

From a visual perspective, the candidate fingerprint 1324 has a left side average that is relatively long compared to the right side average. Furthermore, the right side average is higher than the left side average. The peak is relatively low and the peak index is shifted towards the right side. When compared to the reference fingerprint 1302, the differences are significant. For purposes of example, the candidate fingerprint 1324 is assigned a score of ten out of one hundred.

The candidate fingerprint 1326 has a left side average that is relatively long compared to the right side average, but shorter than that of the candidate fingerprint 1324. The right side average is higher than the left side average. The peak is relatively low and peak index is shifted towards the right side, but less than the shift in the candidate fingerprint 1324. When compared to the reference fingerprint 1302, the differences are significant. For purposes of example, the candidate fingerprint 1326 is assigned a score of fifteen.

The candidate fingerprint 1328 has a left side average that is relatively equal in length to the right side average. The right side average is significantly lower than the left side average. The peak is higher than the peaks of the candidate fingerprints 1324 and 1326 and is relatively centered. When compared to the reference fingerprint 1302, the similarities are significant. For purposes of example, the candidate fingerprint 1328 is assigned a score of ninety-five.

The candidate fingerprint 1330 has a left side average that is short compared to the right side average. The right side average is significantly lower than the left side average. The peak is lower than the peak of the candidate fingerprint 1328 and similar to the peaks of the candidate fingerprints 1324 and 1326. The peak index is relatively far to the left. When compared to the reference fingerprint 1302, the similarities are significant, although less significant than those of the candidate fingerprint 1328. For purposes of example, the candidate fingerprint 1330 is assigned a score of eighty.

For purposes of example, all other scores for candidate fingerprints within the uncertainty region 1314 are less than eighty and greater than fifteen. The scores may be sent as a ranked candidate list as shown in Table 1 below with a higher score indicating a better match.

TABLE 1

Candidate list

| Depth | Score |
|---|---|
| m | 95 |
| n | 80 |
| 2 | 15 |
| 1 | 10 |

Figure 14:
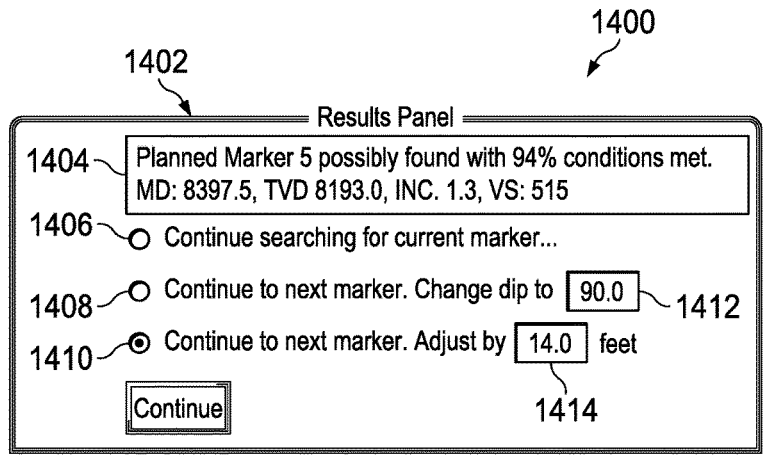
FIG. 14 illustrates one embodiment of a graphical user interface that may report information from the method of FIG. 11 and/or the method of FIG. 12 and allow a modification to be made.

Referring to FIG. 14, one embodiment of a GUI 1400 illustrates an interface that may be used to provide reporting information on a possible match and to present options for modifying the drilling plan. It is understood that the GUI 1400 is for purposes of example and that many different GUIs may be used to provide some or all of the functionality shown with the GUI 1400. In the present example, the GUI 1400 includes a results panel 1402 that may stand alone or may be part of another GUI.

In the present example, a potential match for Planned Marker 5 (e.g., marker 1022 of FIG. 10) has been identified with ninety-four percent of the conditions for a match being met. Information from the log may be provided, including measured depth (MD), TVD, inclination (INC), and vertical section. Continuing the example of FIG. 5, the planned marker 1022 had an estimated depth of 8179 feet and estimated vertical section 515. As reported from the log, the possible match has a TVD of 8193 feet. Accordingly, while at the correct TVD, the possible match is fourteen feet lower than the plan.

The results panel 1402 may present a user with various options, including options 1406, 1408, and 1410. Option 1406 is to continue searching for the next marker without any changes. Option 1408 is to continue to the next marker, but with a change in dip as defined in text box 1412. Option 1410 is to continue to the next marker, but with an adjustment to the next planned marker's estimated TVD as defined in text box 1414. In the current example, option 1410 has been selected and the estimated TVD for the next marker (e.g., planned marker 6) will be adjusted downward by fourteen feet. It is understood that the adjustments of options 1408 and 1410 may affect the remainder of the drilling plan or may be limited (e.g., may only affect a defined number of markers).

Figure 15:
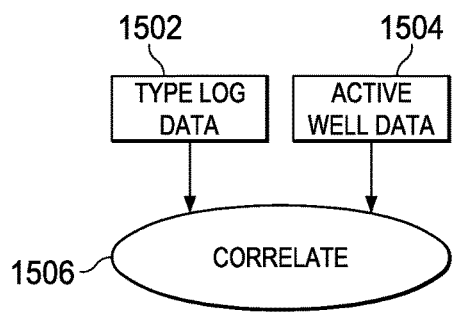
FIG. 15 illustrates correlation between type log data and actively drilling well data.

Dynamic formation detection may also be accomplished using a method that dynamically correlates formation patterns between a previously stored type log (gamma log, ROP log, AES log, etc.) and an actively drilling well. This dynamic formation detection as illustrated in FIG. 15 utilizes the type log data 1502 with the active well data 1504 which may be correlated at 1506 as will be more fully described herein below using dynamic depth warping. This correlation process is carried out dynamically during the drilling of the well rather than at a post processing time. The correlation process 1506 makes real time use of a dynamic depth warping algorithm in order to achieve the formation detection. Dynamic gain adjustment is made between the type log data 1502 and the active well data 1504. The type log data 1502 may comprise gamma data, MSE data, resistivity data and/or ROP data that is correlated with similar data from the active well data 1504. The dynamic depth warping algorithm makes adjustments to the data based upon marker approvals.

Figure 16:
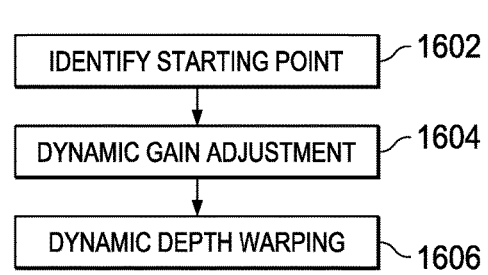
FIG. 16 is a flow diagram generally illustrating the dynamic depth warping process.

Referring now to FIG. 16, there is generally illustrated the dynamic depth warping process. Initially, a starting point for correlation above the geological formation top is identified at step 1602 to act as a starting point for processing by the dynamic depth warping algorithm. In order to focus the dynamic depth warping algorithm to the curves from the well data and the type log data, the start point must be initially established. When geo-plans are created, the plan identifies the formations expected to be encountered while drilling and identify the point at which correlation between the sources becomes meaningful. Thus, the dynamic depth warping algorithm will identify a formation top as a point to start correlation between the type log data 1502 and active well data 1504. In order for the dynamic depth warping algorithm to have enough data to make a good correlation between the type log data 1502 and active well data 1504, the dynamic depth warping algorithm will start a distance D prior to the formation top in each source of data. The distance D is configurable for the dynamic depth warping algorithm process.

In one example, a formation top identified as formation A from the type log data is known to be at a depth of 1000 feet. The prognosis for the depth of formation A for a well being drilled is 1025 feet. Let:

$Depth_{FAT}$=Depth of Formation A in the Type Log 1502

$Depth_{FAA}$=Prognosis Depth of Formation A in the Active Well 1504

D=Distance prior to formation to begin correlation

Then

StartDepth$T$=Depth$_{FAT}$−$D$

StartDepth$A$=Depth$_{FAA}$−$D$

Where

T=Type Log

A=Active Well

The dynamic gain in the range axis can be significantly different between the type log source 1502 and the active well source 1504. If this data is left unaltered, this would lead to unsatisfactory results during the correlation process at 1506. For example, the gamma API count for formation A could be 100 in the type log 1502 and 65 in the well 1504 being drilled. The radioactivity emanating from the formation is the same, but the measuring equipment can be calibrated differently.

To account for the difference in gain measurements, the process automatically gains the data at step 1604 from the type log 1502 to be comparable with the gain in the well being drilled. It will be appreciated that the active well data 1504 could also be gained to the type log data 1502.(In alternative embodiments, other algorithms may be used to determine gain such as using a median value for each curve.) Thus:

A=Curve data from the active well

T=Curve data from the type log

Then:

$$A_{sum} = \sum_{i=0}^{n} A_i$$

$$A_{ave} = \frac{A_{sum}}{n}$$

$$T_{sum} = \sum_{j=0}^{m} T_j$$

$$T_{ave} = \frac{T_{sum}}{m}$$

$$\text{Gain} = \frac{A_{ave}}{T_{ave}}$$

$$T_{gained} = \sum_{j=0}^{m} T_j * T_{ave}$$

Figure 17:
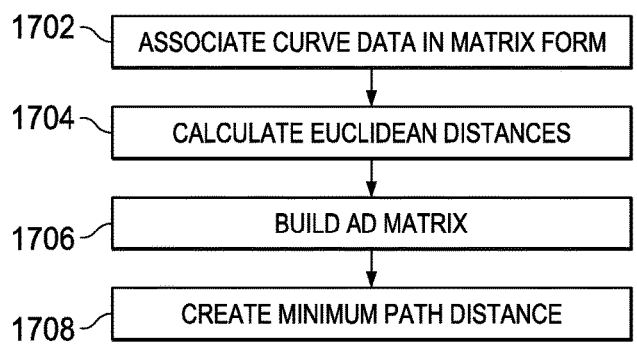
FIG. 17 is a flow diagram illustrating the dynamic depth warping algorithm.

After the data is dynamically gain adjusted, the dynamic depth warping algorithm is applied at step 1606. The dynamic depth warping algorithm is generally illustrated in FIG. 17. Dynamic Depth Warping (DDW) is used for making the best association between curves defined by type log data 1502 and curves from active well data 1504. The DDW algorithm is ideal for this application because it makes associations that consider the entire region of depth. The DDW algorithm finds the best correlation between the two curves defined by the log data 1502 and the well data 1504 as illustrated in FIG. 17. Initially, the curve data for both the type log and the active well are associated in matrix form at step 1702. Next, Euclidean distances are calculated from each point in the curve data at step 1704. This information is used to build an absolute distance matrix at step 1706. The minimum path distance may then be determined at step 1708 from the information within the absolute distance matrix created at step 1706.

The process for associating the curve data in a matrix format at step 1702 first defines the data as follows:

Let $X=A$(curve data from active well)

Let $Y=T_{gained}$(gained curve data from type log)

For simplicity, consider the following set of curves for X and Y:

X=[1, 1, 2, 3, 2, 0];

Y=[0, 1, 1, 2, 3, 2, 1];

The X and Y curves are more particularly illustrated in FIG. 18. The X curve is represented by line 1802 while the Y curve is represented by line 1804. In the present example the X curve is data from the active well while the Y curve is the gained curve data from the type log.

The process of calculating the Euclidean distance between each point within the two selected curves at step 1704 involves calculating the distance from each point in the Y array to each point in the X array. This will provide a matrix of distances as illustrated in FIG. 19. The values for the array are determined by the equation:

$$Dist_{ij} = \sum_{i=1}^{m} \sum_{j=1}^{n} (X_i - Y_j)^2$$

Using the previous defined values for the X and Y curves, this produces the matrix as illustrated in FIG. 19.

The matrix of FIG. 19 is populated in the following manner. Beginning with block 1902, $X_1$, is equal to 1 and is associated with each of the values for $Y_j$ (0, 1, 1, 2, 3, 2, 1). By substituting each of these values of $Y_j$ into the above equation with a value of 1 for $X_i$, the solutions for $Dist_{i,j}$ are obtained as follows: 1, 0, 1, 4, 1, 0, 0. These values are placed in column one of the matrix beginning with entry 1902 and ending with entry 1904. The remaining entries for the remaining columns of the matrix are generated using the remaining values for $X_i$ for each of the other columns in a similar manner.

Referring now back to FIG. 17, using the Euclidean distances determined at step 1704, an accumulated distance (AD) matrix is generated at step 1706. The process, which is generally illustrated in the flow diagram of FIG. 20, begins at start point (0, 0) and the edges, which are special cases. First, the start point (0, 0) is initialized at step 2002.

$AD_{(0,0)}=Dist_{(0,0)}$

Next, row 0 is initialized at step 2004.

$$\sum_{i=1}^{n} AD_{(0,i)} = Dist_{(0,i)} + AD_{(0,i-1)}$$

Column 0 is further initialized at step 2006.

$$\sum_{j=1}^{m} AD_{(j,0)} = Dist_{(j,0)} + AD_{(j-1,0)}$$

An initial table element (i, j) is calculated at step 2008 using the minimum value of these three cells: (i−1, j−1), (i−1, j) and (i, j−1):

$$\sum_{i=1}^{n}\sum_{j=1}^{m} AD_{(i,j)} = Dist_{(i,j)} + \min[(AD_{(i-1,j)}), (AD_{(i-1,j-1)}), (AD_{(i,j-1)})]$$

After determining the first table element, inquiry step 2010 determines if there is a next table element for determination according to the above equation. If so, the table element is incremented to the next values at step 2012, and the table element for the next element is calculated at step 2008. If inquiry step 2010 determines no further table elements exist, the matrix is completed at step 2014. The resultant matrix according to the previously defined curves for X and Y is illustrated in FIG. 21.

Figures 21, 22, 23:
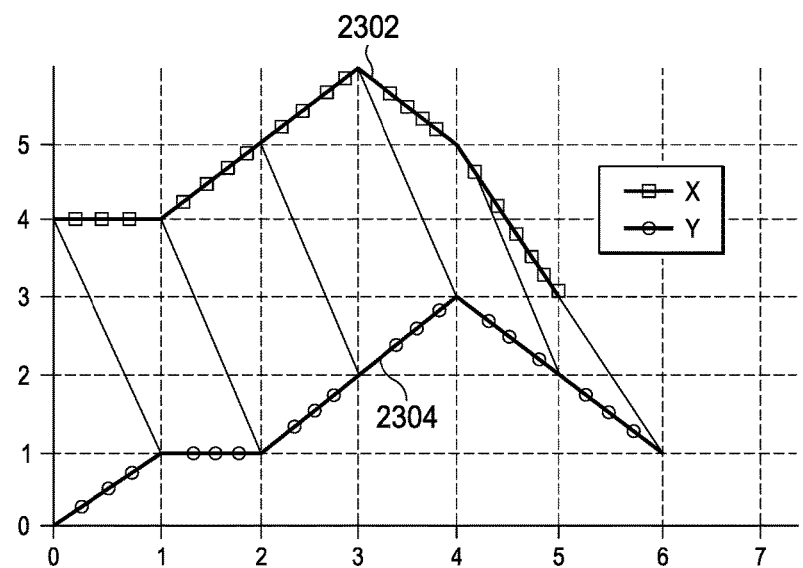
FIG. 21 illustrates an accumulated distance matrix.
FIG. 22 illustrates the minimum distance path within an accumulated distance matrix.
FIG. 23 illustrates two curves with associations.

Referring now back to FIG. 17 and FIG. 22, once the accumulated distance matrix has been generated, matrix is used to determine a minimum distance path at step 1708. The path will start at entry (0, 0) 2202 and end at entry (n, m) 2204. The path is chosen using an algorithm which starts at point (m,n) and works backward toward point (0, 0). At point (m,n) the algorithm looks for the lowest value in the preceding cells (see Error! Reference source not found.):

$$Path_1 = \min(cell_{(m-1,n-1)}, cell_{(m,n-1)})$$

When this cell has been determined the algorithm looks for the minimum value in the preceding cells to this cell as shown above. This process continues until the cell chosen is point (0,0).

The minimum distance path for the above-referenced matrix comprises all of the shaded entries between entry 2202 and entry 2204 of FIG. 22. The path is defined by:

$$Path = [(0,0), (0,1), (1,1), (1,2), (2,3), (3,4), (4,5), (5,6)]$$

The path shows the optimum warping path which minimizes the sum of distances along the path. The set of (x, y) pairs represent the best association between the two curves, which can now be used for interpretation and visualization.

Referring now to FIG. 23 there are illustrated the original curves consisting of the X curve 2302 and the Y curve 2304, but with the curve data from the type log (X) offset higher than the active well log (Y). This illustrates the manner in which the association lines 2306 can be more easily seen.

When large sets of data are used for the X and Y curves, the number of possible warping paths through the matrix can be exponentially large. In order to overcome this issue, a number of different restrictions may be placed on the number of warping paths through the matrix to reduce the total number of paths to a reasonable number for consideration by the algorithm.

Figure 24:
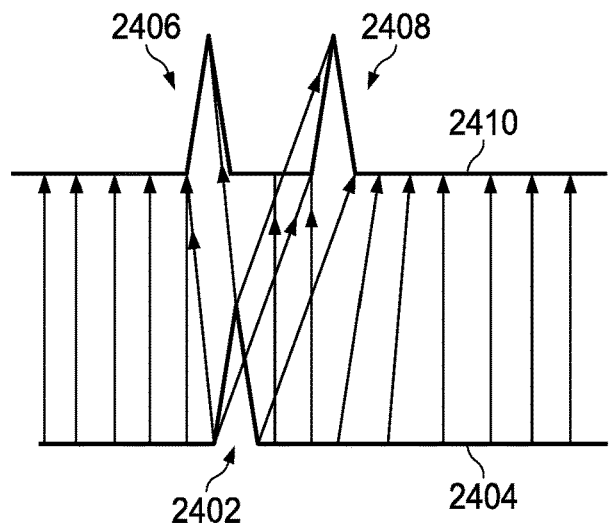
FIG. 24 illustrates a case where a single feature matches multiple features between two curves.
Figure 25:
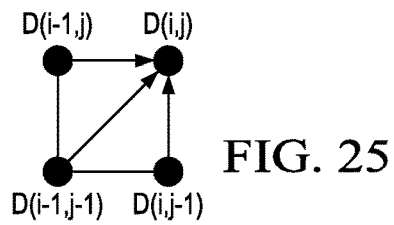
FIG. 25 illustrates the adjacent cells considered when building a warping path.

A first restriction relates to monotonicity. The warping path cannot go back in "depth" index. This guarantees that features are not repeated. Without this monotonicity restriction, a feature in one curve could be associated more than once in other curves as illustrated in FIG. 24. In this case, feature 2402 of data set 2404 is being matched to features 2406 and 2408 of data set 2410. The monotonicity restriction is accomplished by considering only the cells illustrated in FIG. 25 when building the warping path. These include cells D(i, j), D(i, j−1), D(i−1, j) and D(i−1, j−1) and are all adjacent.

Figure 26:
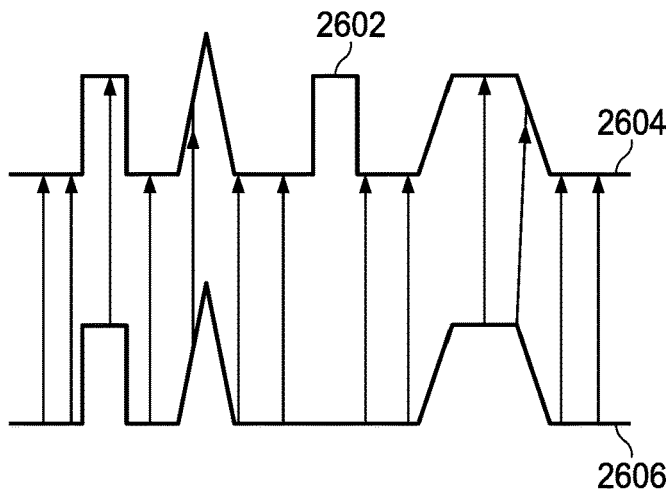
FIG. 26 illustrates a case where important features are skipped between two curves.

A further restriction considered is continuity. The warping path does not jump in the "depth" index. This guarantees that important features are not omitted as demonstrated in FIG. 26. In this case, feature 2602 has been skipped in the data set 2604 when being warped with data set 2606. The continuity restriction is accomplished by ensuring indexes i and j are incremented in steps of no more than one.

Figure 27:
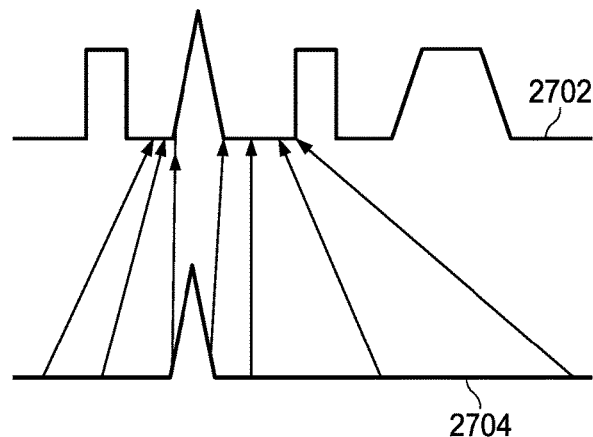
FIG. 27 illustrates a case where alignment considers only part of the data between two curves.

A third restriction involves the use of boundary conditions. To ensure that the warping path does not consider only partial sequences, the warping path starts at the bottom left of the matrix and ends at the top right of the matrix. This assists in avoiding a circumstance such as that illustrated in FIG. 27, wherein the alignment process considered only a portion of data set 2702 when being compared with data set 2704.

Figure 28:
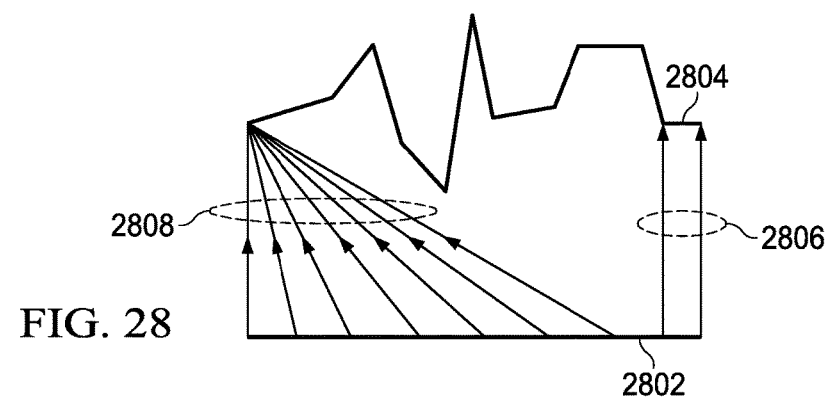
FIG. 28 illustrates a case where a warping path wanders too far.
Figure 29:
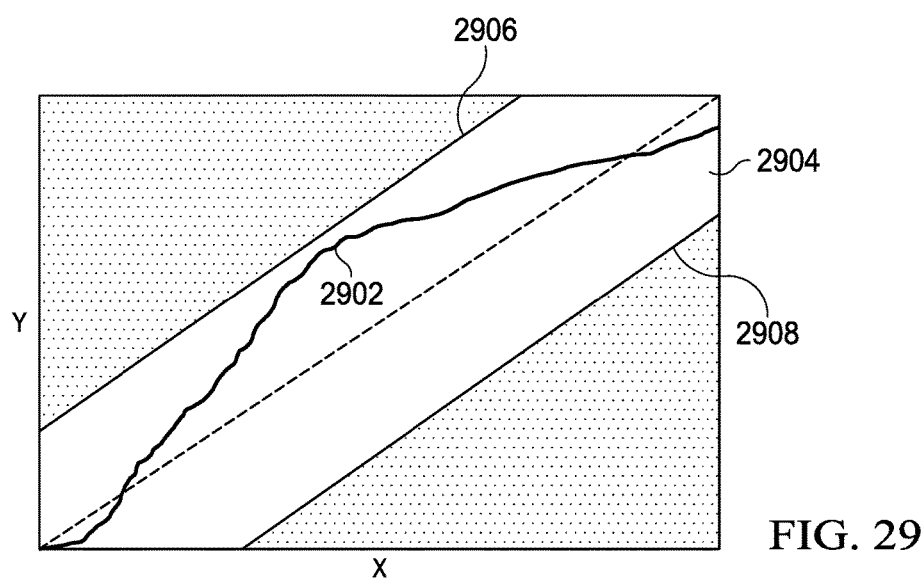
FIG. 29 illustrates a warping path with warping window.

Another restriction involves the use of warping windows. The warping window ensures the warping path does not wander too far from the predicted range. This guarantees that the warping path does not try to skip two different features and become stuck at similar features. FIG. 28 illustrates a case where the warping path wanders. Data set 2802 and for warping path comparisons 2806 the process proceeds normally. However, at warping path comparison 2808, the process veers too far from the previous warping processes 2806 skipping over a large portion of the data of data set 2804. The warping window is configurable and symmetric around the matrix diagonal as illustrated in FIG. 29 such that features which may be missing due to geological faulting can be ignored. The warping path 2902 remains within the warping window 2904 and its upper bound 2906 and lower bound 2908. A wider warping window 2904 allows for larger faults but is more easily taken off track. A more narrow warping window 2904 keeps the warping path 2902 moving forward in formations where there is more control but less tolerance of true faults.

Figure 30:
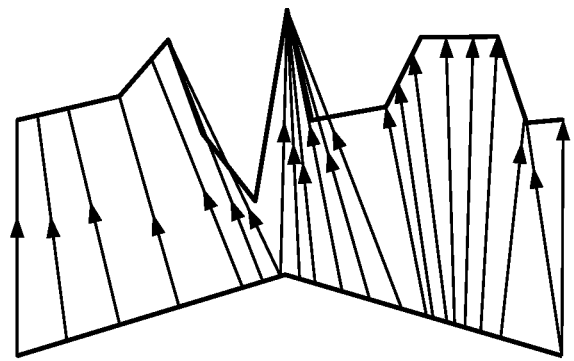
FIG. 30 illustrates a case where short paths are matched with long paths between two curves.

A final restriction uses slope constraints. Slope constraints ensure that the warping path will not become too steep or too shallow. This guarantees that very short parts of the sequences are not matched to very long parts of the sequences. An example of a non-slope constrained warping is shown in FIG. 30. The use of slope constraints prevent the longer sections of path from being matched with the shorter paths.

Adjustments may also be made to the warping algorithm based upon marker approvals. There are many paths through a warping matrix. There are more paths existing than can be evaluated in a timely manner especially as the drilling depth increases. However, the degree of uncertainty can be greatly reduced by pre-approving or selecting a correlation point which represents a point of truth.

Figure 31:
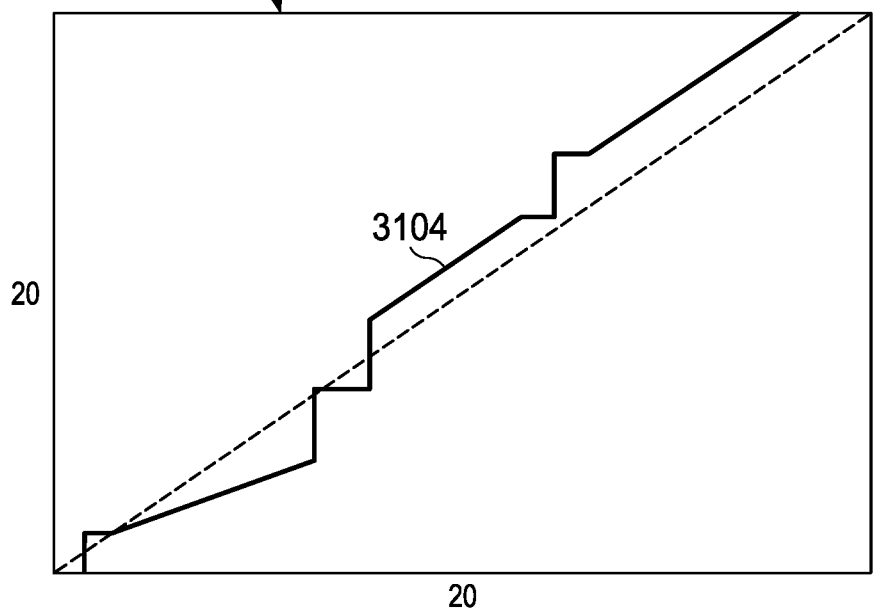
FIG. 31 illustrates a warping path within a 20 foot warping window.
Figure 32:
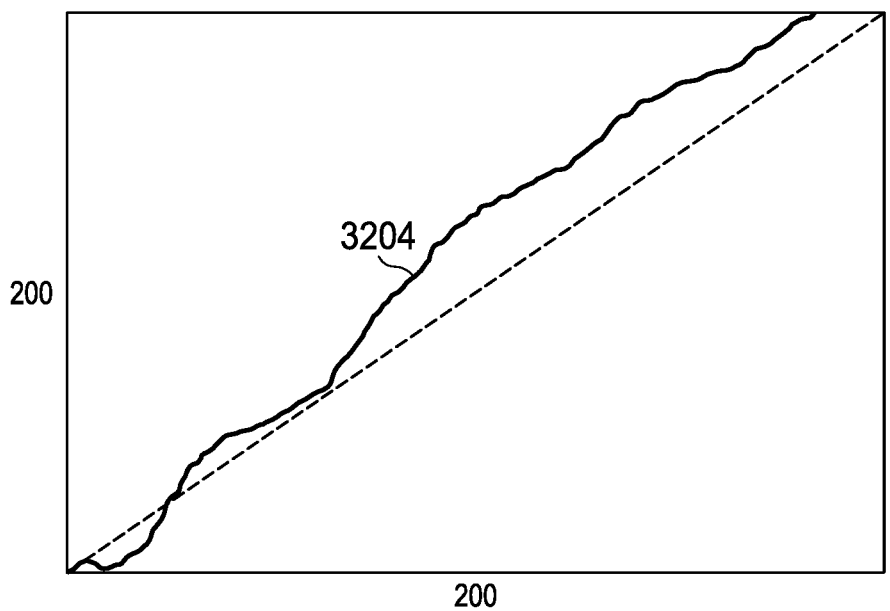
FIG. 32 illustrates a warping path within a 200 foot warping window.

Referring now to FIG. 31, imagine a scenario where correlation proceeds past the start point for 20 feet. The warping window 3102 is 20×20 and the warping path 3104 may appear as illustrated. Referring now to FIG. 32 after drilling for 200 feet, the matrix becomes 200×200 with a warping path 3204 that takes the minimum distance as illustrated.

Figure 33:
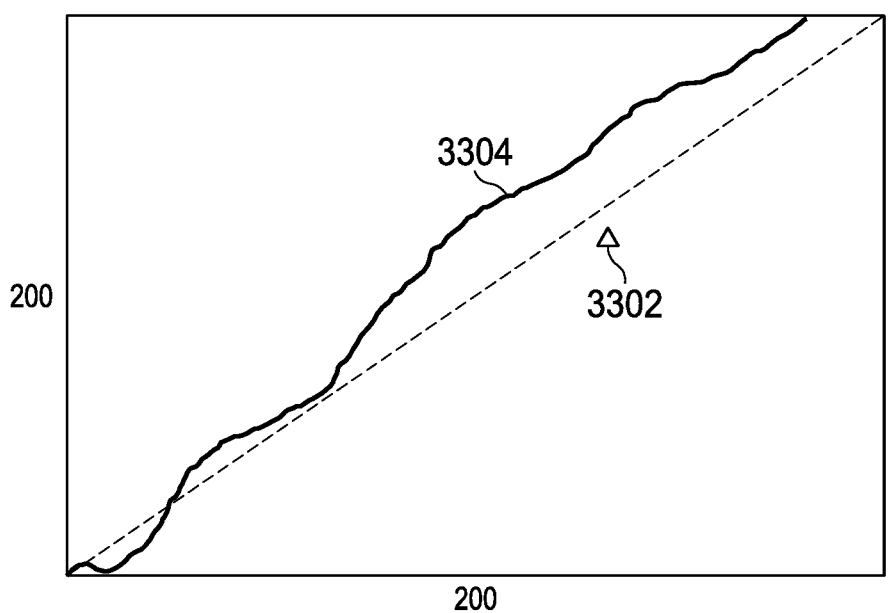
FIG. 33 illustrates a 200 foot warping window including an approved marker.

Referring now to FIG. 33, if during this range of drilling, a marker can be seen and verified, the marker may be approved and become an approved marker 3302 that is associated with the original warping path 3304. The approved marker 3302 may or may not lie on the existing warping path 3304. In the example of FIG. 33, the approved marker 3302 is outside of the warping path 3304.

Figure 34:
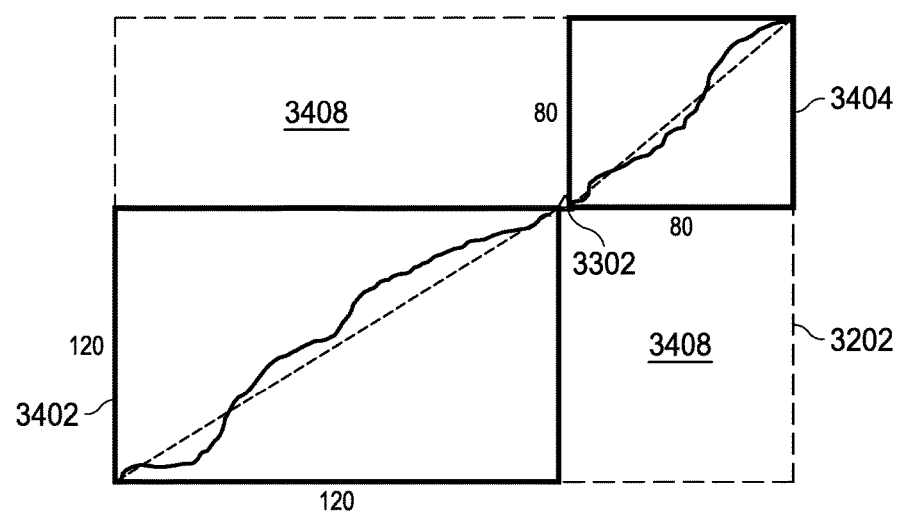
FIG. 34 illustrates a partitioned 200 foot warping window.

The larger 200×200 warping window 3202 can be split into two smaller windows as illustrated in FIG. 34. This adjusts the path based upon the known approved marker 3302. The 200×200 warping window 3302 is broken down into a 120×120 warping window 3402 and an 80×80 warping window 3404. The 120×120 warping window 3402 goes from the starting point (0, 0) to the approved marker 3302 at (120, 120). The 80×80 warping window 3404 begins at the approved marker 3302 at (120, 120) and ends at the original ending point of the 200 ×200 warping window 3202. This adjusts the warping path based upon the truth data (the known, approved marker 3302). Another benefit of this partitioning is that the dynamic depth warping algorithm will use less processing time since it does not have to consider the areas 3408 outside of the new warping windows.

Figure 35:
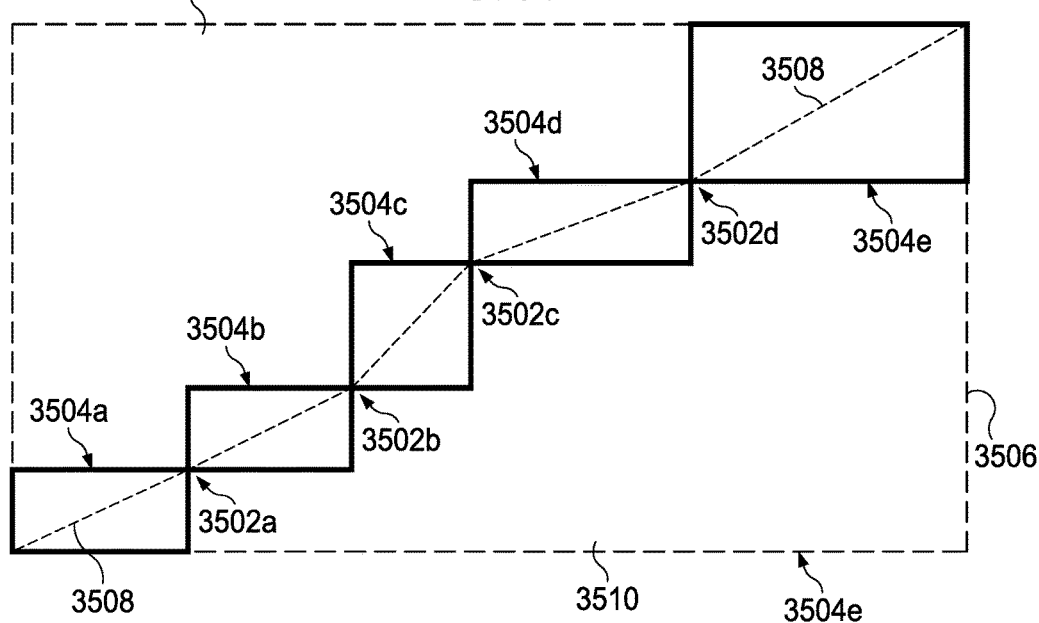
FIG. 35 illustrates a large drilling area including a plurality of working windows.

Over the course of a large drilling area, the benefit of partitioning the warping windows based on approved markers 3302 becomes more apparent as illustrated in FIG. 35. In this example, approved markers are located at points 3502. A number of warping windows 3504 are established within the original warping window 3506 using the approved markers 3502. Thus, initial warping window 3504a goes from the starting point 3508 to approved marker 3502a. Warping window 3504b goes from approved marker 3502a to approved marker 3502b. The rest of the warping windows 3504 are produced in a similar fashion. As can be seen, large areas 3510 of the original warping window 3506 now lie outside of the new warping windows 3504 and no longer have to be processed. The dynamic depth warping algorithm can, and should, create a warping path even without approved markers 3502. The resultant path is always the most optimized path across the region, given the boundary conditions.

Figure 36:
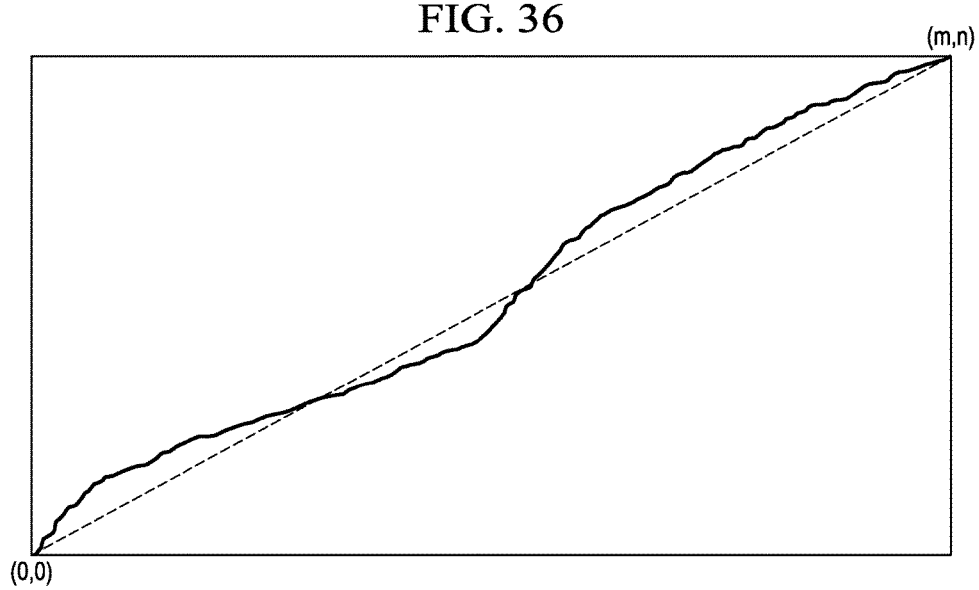
FIG. 36 illustrates a point to point warping window.
Figure 37:
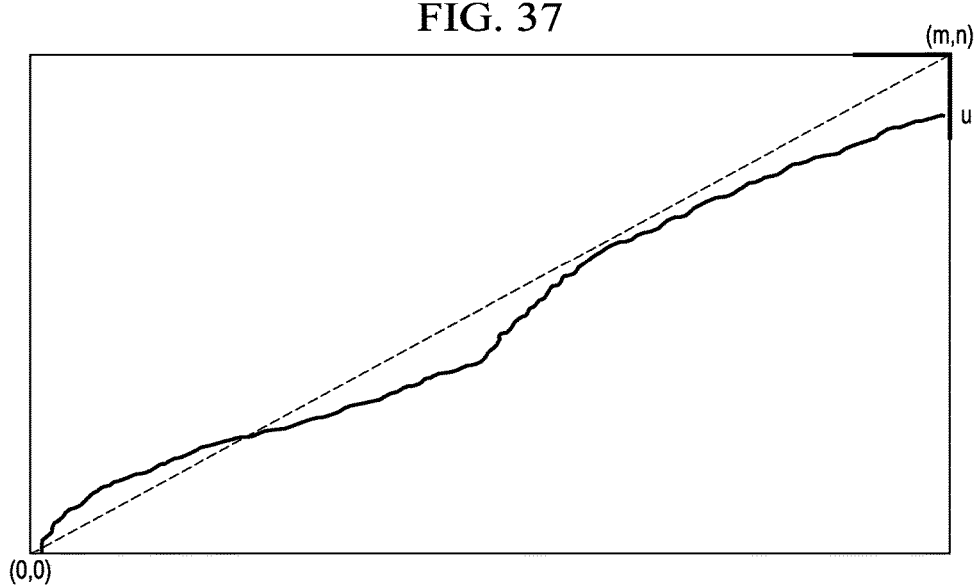
FIG. 37 illustrates a point to area warping window.

Two types of warping windows are used depending on where the warping window exists in the drilling area. These include point-to-point warping windows and point-to-area warping windows. The point-to-point warping window is used when the start and end points are well-known. The points to area warping window is used when the starting point is well-known but the endpoint has uncertainty. The point-to-point warping window is used for areas between approved markers. The point-to-area warping window issues primarily in the leading edge of drilling. The uncertainty value for the ending area is set to account for faulting, thinning and thickening in the formation. A point-to-point warping window is a matrix where the warping path begins at point (0, 0) and ends at a second point (m, n) as illustrated in FIG. 36. A point-to-area warping window is a matrix where the warping path begins at a point (0, 0) and ends within an area as illustrated in FIG. 37. This area lies along two lines (m, n–u) . . . (m, n) and (m–u, n) . . . (m, n), where u is an uncertainty value.

Using the above described dynamic depth warping process type log data and actual drilling well data may be compared in real time to provide better dynamic formation detection by dynamically correlating formation patterns between a type log and actively drilling well.

It will be appreciated by those skilled in the art having the benefit of this disclosure that this system and method for formation detection and evaluation using dynamic depth warping. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for correlating first well log data from a previously generated well with second well log data from an actively drilling well, comprising:
   identifying a starting depth above a geological formation;
   dynamically gain adjusting the first well log data to the second well log data during drilling of the actively drilling well;
   dynamically depth warping the gain adjusted first well log data to the second well log data to correlate the first well log data with the second well log data during drilling of the actively drilling well, wherein the step of dynamically depth warping further comprises:
   associating first curve data for the gain adjusted first well log data and second curve data for the second well log data in a matrix format;
   calculating a Euclidean distance between each point of the first curve data for the gain adjusted well log data and the second curve data for the second well log data;
   placing the calculated Euclidean distances into a first matrix;
   converting the first matrix Euclidean distance values into an absolute distance matrix of accumulated distance values;
   defining a plurality of warping windows around a diagonal of the absolute distance matrix, the warping windows defining upper and lower limits of the warping path, each of the plurality of warping windows having at least one corner thereof defined by a predefined approved well marker, adjacent warping windows are connected at one of the predefined approved well marker, and each of the plurality of warping windows not contained within one of the other warping windows;
   determining a minimum distance path within the absolute distance matrix;
   associating the determined minimum distance path with an optimum warping path between the first well log data and the second well log data;
   associating a newly identified marker within a first warping window based on well log data of an actively drilling well, wherein the newly identified marker is based on log data from the actively drilling well;
   defining a second warping window in which the newly identified marker defines the upper limit of the second warping path;
   determining a second minimum distance path within the second warping window; and
   controlling drilling of the actively drilling well responsive to the optimum warping path.

2. The method of claim 1, wherein the step of converting further comprises:
   initializing a starting point of the first matrix;
   initializing row zero of the first matrix;
   initializing column zero of the first matrix;
   computing a minimum distance value for each element of the first matrix; and
   placing the minimum distance values into the accumulated distance matrix.

3. The method of claim 1, wherein the warping path cannot associate a feature from the first curve with a feature of the second curve more than once.

4. The method of claim 1, wherein the warping path cannot skip important features of the first curve data and the second curve data during the correlation process.

5. The method of claim 1, wherein the warping path begins at the bottom left corner of the absolute distance matrix and ends at the top right corner of the absolute distance matrix.

6. The method of claim 1, wherein the upper and lower limits within each of the plurality of warping window are configurable.

7. The method of claim 1, wherein the warping path may not exceed a predetermined slope.

8. A system for correlating first well log data from a previously generated well with second well log data from an actively drilling well, comprising:
- a network interface;
- a processor coupled to the network interface;
- a surface controller coupled to an active bottom hole assembly in the actively drilling well;
- a memory coupled to the processor and configured to store a plurality of instructions executable by the processor, the instructions including instructions for:
- identifying a starting depth above a geological formation;
- dynamically gain adjusting the first well log data to the second well log data during drilling of the actively drilling well;
- dynamically depth warping the gain adjusted first well log data to the second well log data to correlate the first well log data with the second well log data during drilling of the actively drilling well;
- associating first curve data for the gain adjusted first well log data and second curve data for the second well log data in a matrix format;
- calculating a Euclidean distance between each point of the first curve data for the gain adjusted well log data and the second curve data for the second well log data;
- placing the calculated Euclidean distances into a first matrix;
- converting the first matrix Euclidean distance values into an absolute distance matrix of accumulated distance values;
- defining a plurality of warping windows around a diagonal of the absolute distance matrix, the warping windows defining upper and lower limits of the warping path, each of the plurality of warping windows having at least one corner thereof defined by a predefined approved well marker, adjacent warping windows are connected at one of the predefined approved well marker, and each of the plurality of warping windows is not contained within one of the other warping windows;
- determining a minimum distance path within the absolute distance matrix; and
- associating the determined minimum distance path with an optimum warping path between the first well log data and the second well log data; and
- controlling drilling of the actively drilling well through said connection with said surface controller responsive to the optimum warping path.

9. The system of claim 8, wherein the instructions for converting further comprise instructions for:
- initializing a starting point of the first matrix;
- initializing row zero of the first matrix;
- initializing column zero of the first matrix;
- computing a minimum distance value for each element of the first matrix; and
- placing the minimum distance values into the accumulated distance matrix.

10. The system of claim 8, wherein the warping path is adapted to not associate a feature from the first curve with a feature of the second curve more than once.

11. The system of claim 8, wherein the warping path is adapted to not skip important features of the first curve data and the second curve data during the correlation process.

12. The system of claim 8, wherein the warping path begins at the bottom left corner of the absolute distance matrix and ends at the top right corner of the absolute distance matrix.

13. The system of claim 8, wherein the upper and lower limits within each of the plurality of warping windows are configurable.

14. The system of claim 8, wherein the warping path is adapted to not exceed a predetermined slope.

15. A method for correlating first well log data from a previously generated well with second well log data from an actively drilling well, comprising:
- associating first curve data for the first well log data and second curve data for the second well log, data in a matrix format during drilling of the actively drilling well;
- calculating a Euclidean distance between each point of the first curve data for the well log data and the second curve data for the second well log data during drilling of the actively drilling well;
- placing the calculated Euclidean distances into a first matrix during drilling of the actively drilling well;
- converting the first matrix Euclidean distance values into an absolute distance matrix of accumulated distance values during drilling of the actively drilling well;
- defining a plurality of warping windows around a diagonal of the absolute distance matrix, the warping windows defining upper and lower limits of the warping path, each of the plurality of warping windows having at least one corner thereof defined by a predefined approved well marker, adjacent warping windows are connected at one of the predefined approved well marker, and each of the plurality of warping windows are adapted to not be contained within one of the other warping windows during drilling of the actively drilling well;
- determining a minimum distance path within the absolute distance matrix during drilling of the actively drilling well;
- associating the determined minimum distance path with an optimum warping path between the first well log data and the second well log data during drilling of the actively drilling well; and
- controlling drilling of the actively drilling well responsive to the optimum warping path.

16. The method of claim 15, wherein the step of converting further comprises:
- initializing a starting point of the first matrix;
- initializing row zero of the first matrix;
- initializing column zero of the first matrix;
- computing a minimum distance value for each element of the first matrix; and
- placing the minimum distance values into the accumulated distance matrix.

17. The method of claim 15, wherein the warping path is adapted to not associate a feature from the first curve with a feature of the second curve more than once.

18. The method of claim 15, wherein the warping path is adapted to not skip important features of the first curve data and the second curve data during the correlation process.

19. The method of claim 15, wherein the warping path begins at the bottom left corner of the absolute distance matrix and ends at the top right corner of the absolute distance matrix.

20. The method of claim 15, wherein the upper and lower limits of the warping window are configurable.

21. The method of claim 15, wherein the warping path is adapted to not exceed a predetermined slope.

22. A method for dynamically generating a drilling path during active drilling of a well, said method comprising the following steps executed in a processor connected to a surface controller of an actively drilling well:

gain adjusting, a first well log data to a planned second well log data;

depth warping the gain adjusted first well log data to the planned second well log data to correlate the first well log data with the second well log data, wherein the step of depth warping further comprises:

associating first curve data for the gain adjusted first well log data and second curve data for the planned second well log data in a matrix format;

calculating a Euclidean distance between each point of the first curve data for the gain adjusted well log data and the second curve data for the second well log data;

placing the calculated Euclidean distances into a first matrix;

converting the first matrix Euclidean distance values into an absolute distance matrix of accumulated distance values;

defining a plurality of warping windows around a diagonal of the absolute distance matrix, the warping windows defining upper and lower limits of the warping path, each of the plurality of warping windows having at least one corner thereof defined by a predefined approved well marker, wherein adjacent warping windows are connected at one of the predefined approved well markers;

determining a minimum distance path within the absolute distance matrix;

associating the determined minimum distance path with an optimum warping path between the first well log data and the second planned well log data;

associating a newly identified marker within a first warping window based on well log data of an actively drilling well;

defining a second warping window contained within the first warping window in which the newly identified marker defines the upper limit of the warping path; and controlling drilling of the actively drilled well through said surface controller.

\* \* \* \* \*